(12) United States Patent
Moriya et al.

(10) Patent No.: US 8,497,873 B2
(45) Date of Patent: Jul. 30, 2013

(54) APPARATUS AND METHOD FOR CORRECTION OF PROJECTED IMAGES

(75) Inventors: Shotaro Moriya, Tokyo (JP); Noritaka Okuda, Tokyo (JP); Toshiaki Kubo, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1003 days.

(21) Appl. No.: 12/550,852

(22) Filed: Aug. 31, 2009

(65) Prior Publication Data

US 2010/0245393 A1   Sep. 30, 2010

(30) Foreign Application Priority Data

Mar. 26, 2009   (JP) ................. 2009-075831

(51) Int. Cl.
   *G09G 5/00*   (2006.01)
(52) U.S. Cl.
   USPC ............ 345/606; 345/698; 345/699; 345/660
(58) Field of Classification Search
   USPC .... 345/698, 699, 606, 660; 715/238; 348/445
   See application file for complete search history.

(56) References Cited

U.S. PATENT DOCUMENTS

2006/0001774 A1*   1/2006 Kamimura ............... 348/581

FOREIGN PATENT DOCUMENTS

JP   8-102900 A   4/1996

* cited by examiner

*Primary Examiner* — Michelle L Sams
(74) *Attorney, Agent, or Firm* — Birch, Stewart, Kolasch & Birch, LLP

(57) ABSTRACT

An image processing apparatus determines a reference pixel position for each pixel by an interpolation calculation using the distortion correction values for representative pixels stored in a correction value storage unit, decides whether the distortion correction values used in the interpolation satisfy a predetermined condition, reads a plurality of pixel values from an image data storage unit according to values of their reference pixel position, determines first interpolation coefficients from a value of its reference pixel position, and determines the pixel value in the output image from the plurality of pixel values read and the first interpolation coefficients. The image processing apparatus determines second interpolation coefficients from said value of its reference pixel position and a predetermined function, and selects, according to the decision result, either the second interpolation coefficients or third interpolation coefficients for use as the first interpolation coefficients.

23 Claims, 14 Drawing Sheets

FIG.8

| | CONDITIONS | | C6A | | | | C6 | | | |
|---|---|---|---|---|---|---|---|---|---|---|
| | P2 | UDEC | C6A(-1) | C6A(0) | C6A(1) | C6A(2) | C6(-1) | C6(0) | C6(1) | C6(2) |
| 1 | P2(J,K)=0 AND P2(J,K+1)=0 AND P2(J+1,K)=0 AND P2(J+1,K+1)=0 | ALWAYS 0 | 0 | 1 | 0 | 0 | 0 | 1 | 0 | 0 |
| 2 | | 0 | 0 | 1 | 0 | 0 | COMBINATIONS OTHER THAN THE ABOVE SATISFYING Σ C6(i)=1 | | | |
| 3 | OTHER THAN THE ABOVE | 1 | COMBINATIONS OTHER THAN THE ABOVE SATISFYING Σ C6A(i)=1 | | | | COMBINATIONS OTHER THAN THE ABOVE SATISFYING Σ C6(i)=1 | | | |

FIG.9
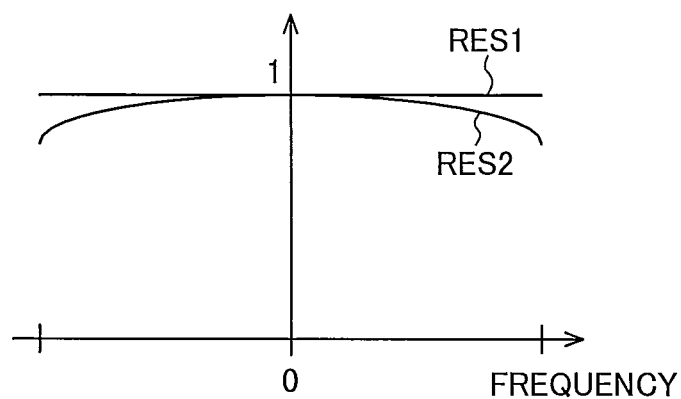
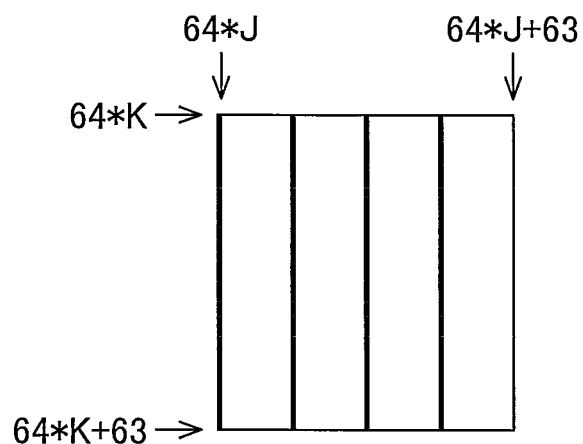
FIG.10A
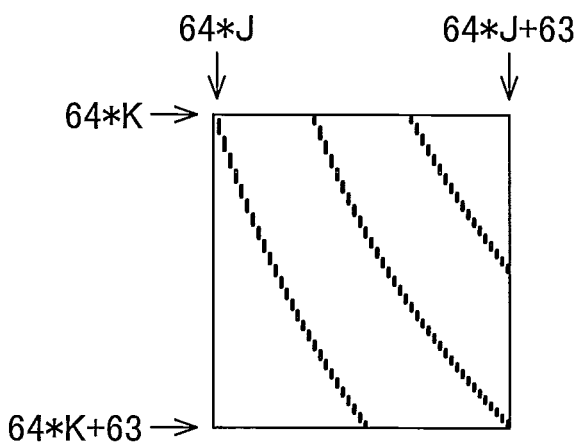
FIG.10B

APPARATUS AND METHOD FOR CORRECTION OF PROJECTED IMAGES

BACKGROUND OF THE INVENTION

1. Field of the Invention

The present invention relates to an image processing apparatus for outputting a projection image to a display unit in an image display apparatus that projects the projection image onto a projection surface by using an image projecting means having an optical system.

2. Description of the Related Art

In liquid crystal projector apparatus, rear projection television sets, and other such projection display apparatus, factors such as the positional relationship between the projection light source and the screen and aberration in the optical system may produce image distortion (keystone distortion). Methods of correcting this distortion by projecting an image that has been transformed with characteristics inverse to the distortion are known.

In one of these methods, the image is corrected by electrical signal processing; in a liquid crystal projector apparatus described in Japanese Patent Application Publication No. H8-102900 (in particular, paragraph 0047, FIG. 3), keystone distortion is corrected by linear interpolation between adjacent pixels in the scanning lines of an input video signal.

In the prior art referred to above, the frequency characteristic of the filter selected for interpolation may produce patterns, causing problems of image quality.

SUMMARY OF THE INVENTION

An object of the invention is to solve the problem discussed above.

An image processing apparatus according to the present invention generates an output image from an input image having pixels arranged in mutually different first and second directions in a matrix, at least part of the input image being enlarged or reduced in the output image, the at least part of the input image being enlarged or reduced by determining a pixel value of a pixel assumed to exist at a position in the input image before the enlarging or reducing coordinate transformation, and using the pixel value thus determined as a pixel value of the output image, the image processing apparatus comprising:

an image data storage unit configured to hold the pixel values of the pixels in the input image;

a correction value storage unit configured to hold, as correction values, for each of at least some of the pixels in the output image being used as representative pixels, a difference between the coordinate of the pixel in the first direction and the coordinate in the first direction before the coordinate transformation in the input image, for use in determining the pixel value of said each of the representative pixels;

a reference pixel position calculation unit configured to determine a position of each pixel in the input image before the coordinate transformation by an interpolation calculation using the correction values for the representative pixels, in order to determine the pixel value of said each pixel in the output image, and output the result as a reference pixel position;

a decision unit configured to decide, for each pixel in the output image, whether or not the correction values used in the interpolation calculation satisfy a predetermined condition;

an image data reading unit configured to read from the image data storage unit, for each pixel in the output image, the pixel values of a plurality of pixels including said each pixel and pixels positioned in its vicinity, according to values of their reference pixel positions;

an interpolation coefficient determination unit configured to determine, for said each pixel in the output image, first interpolation coefficients according to a value of its reference pixel position; and an interpolation calculation unit configured to obtaining the pixel value in the output image from the values of said plurality of pixels and the first interpolation coefficients; wherein the interpolation coefficient determination unit includes an interpolation coefficient calculation unit configured to determine second interpolation coefficients from said value of its reference pixel position and a predetermined function, and an interpolation coefficient switching unit configured to output the second interpolation coefficients or predetermined third interpolation coefficients as the first interpolation coefficients according to the reference pixel position calculated by the reference pixel position calculation unit and the decision by the decision unit.

According to the invention, the quality of the image can be improved because the interpolation coefficients are modified appropriately in the interpolation coefficient determination unit, according to the output of the decision unit, so that the patterns due to the frequency characteristic of the filter selected for interpolation can be avoided.

BRIEF DESCRIPTION OF THE DRAWINGS

In the attached drawings:

FIG. 8 is a drawing showing examples of interpolation coefficients C6A(i) and C6(i) used under different conditions;

FIG. 9 is a drawing illustrating frequency responses RES1 and RES2;

FIGS. 10A and 10B are drawings illustrating a defect caused by a difference in frequency responses;

DETAILED DESCRIPTION OF THE EMBODIMENTS

First Embodiment

Figure 1:
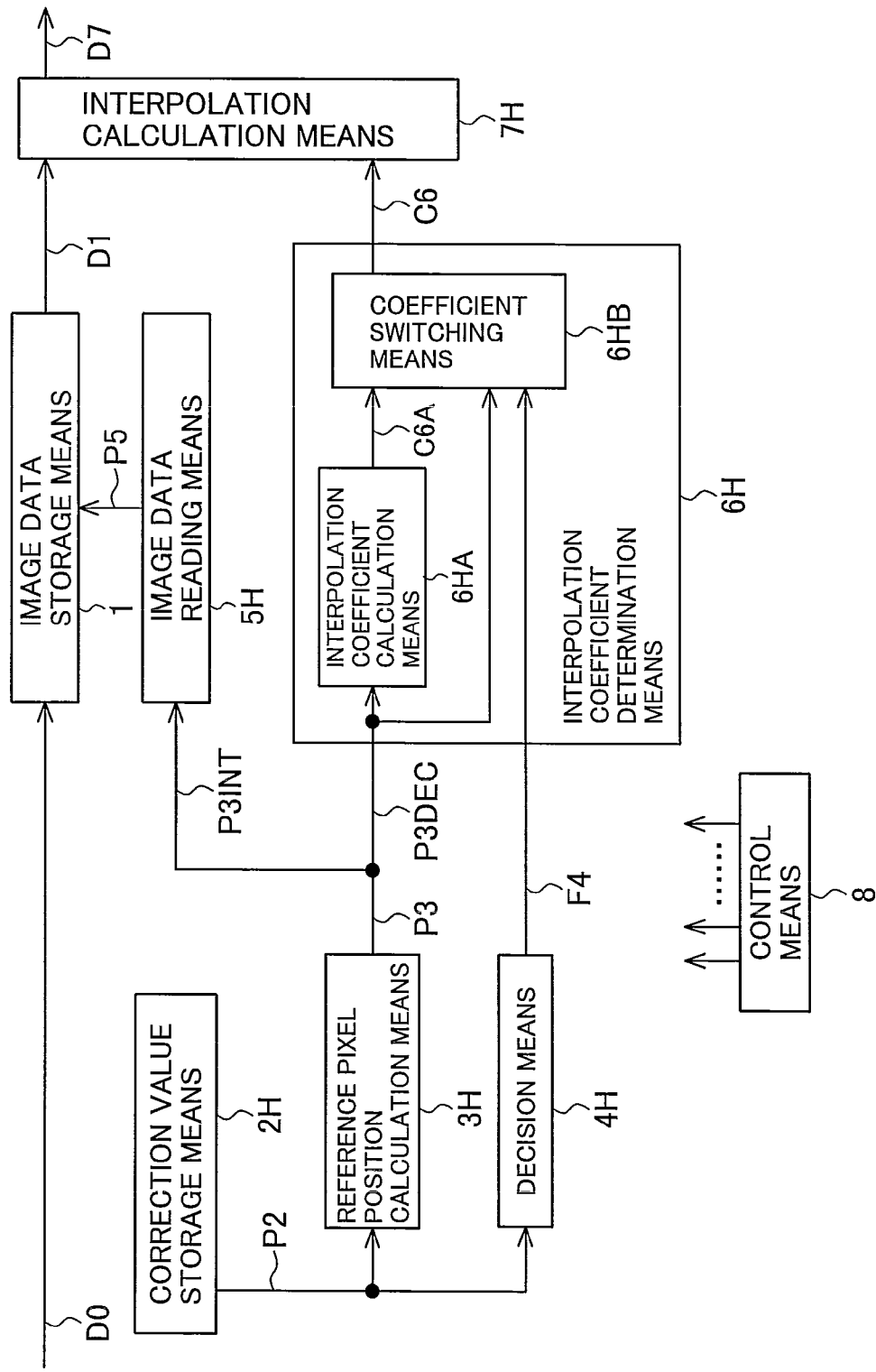
FIG. 1 is a block diagram illustrating the image processing apparatus in a first embodiment of the invention.

FIG. 1 is a drawing illustrating the structure of an image processing apparatus according to the first embodiment of the invention. The image processing apparatus U0 in the drawing has an image data storage means 1, a correction value storage means 2H, a reference pixel position calculation means 3H, a decision means 4H, an image data reading means 5H, an interpolation coefficient determination means 6H, an interpolation calculation means 7H, and a control means 8. The control means 8 controls the image data storage means 1, correction value storage means 2H, reference pixel position calculation means 3H, decision means 4H, image data reading means 5H, interpolation coefficient determination means 6H, and interpolation calculation means 7H so that they operate in concert. The control signal lines from the control means 8 to the other means are omitted in the drawing.

The interpolation coefficient determination means 6H includes an interpolation coefficient calculation means 6HA and a coefficient switching means 6HB.

Figure 2:
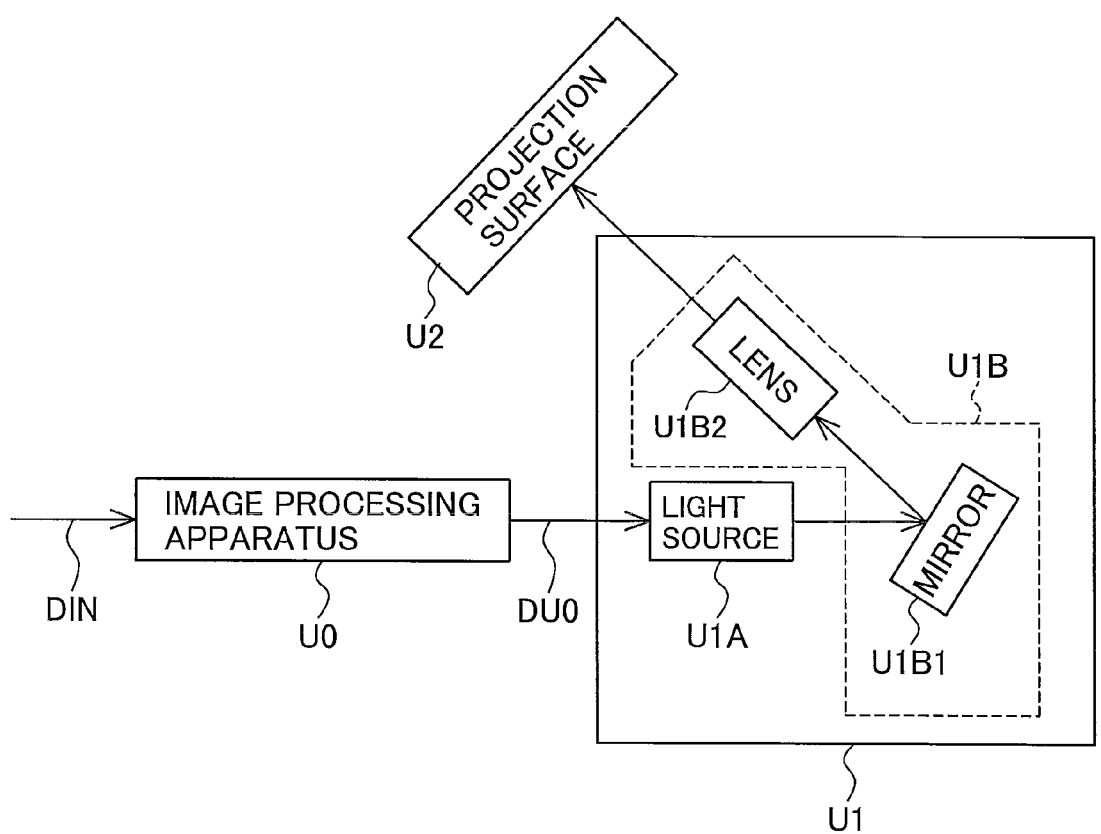
FIG. 2 is a block diagram illustrating an exemplary structure of a projection television set.

The image processing apparatus shown in FIG. 1 can be used as part of an image display apparatus, typically a projection display apparatus such as, for example, the rear projection television set shown in FIG. 2.

The rear projection television set shown in FIG. 2 comprises the image processing apparatus U0 shown in FIG. 1, an image projecting means U1, and a projection surface U2. The image projecting means U1 includes a light source U1A and an optical system U1B. The optical system U1B includes a mirror U1B1 and a lens U1B2.

In the rear projection television set shown in FIG. 2, a picture corresponding to an input image DIN is projected onto the projection surface U2 by the following procedure. First, the image processing apparatus U0 outputs an image DU0 on which a process described later has been performed.

Next, the light source U1A outputs light corresponding to the image DU0, and the light output from the light source U1A is projected onto the projection surface U2 through the optical system U1B including the mirror U1B1 and lens U1B2.

Figure 3A:
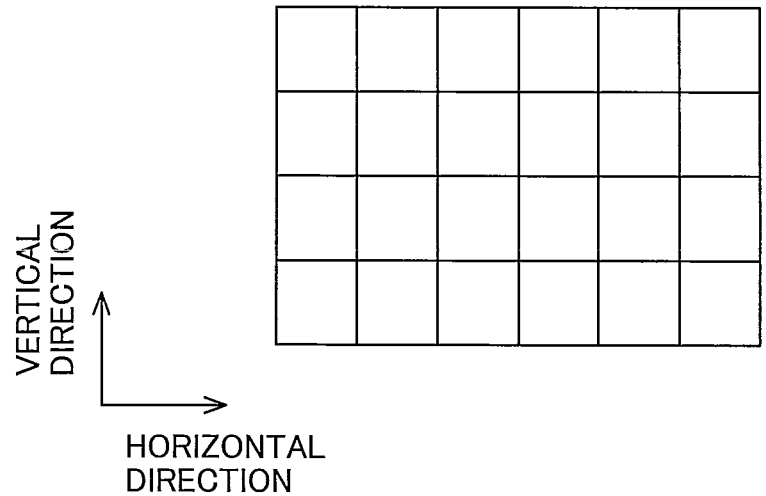
FIGS. 3A and 3B are drawings showing an example of distortion due to an optical system.
Figure 3B:
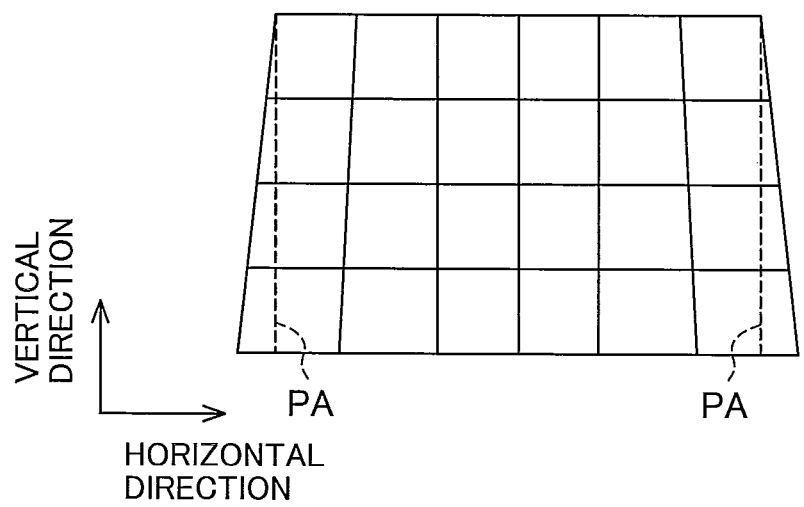

It is assumed here that the optical system U1B produces distortion in a first direction, for example, in the horizontal direction. FIGS. 3A and 3B are drawings schematically illustrating the distortion. When a lattice-like image consisting of horizontal lines and vertical lines as shown in FIG. 3A is projected through the optical system U1B onto the projection surface U2, an image in which the lattice is trapezoidally distorted is displayed. The dotted lines PA shown in FIG. 3B indicate the range of the image displayed on the projection surface U2 when the upper edge of the trapezoidal image is adjusted to match the width of the projection surface.

Figure 4:
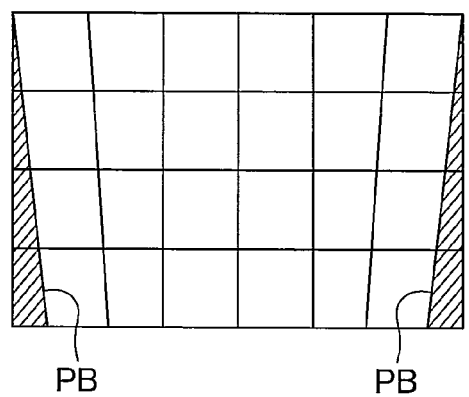
FIG. 4 is a drawing illustrating distortion inverse to the distortion shown in FIGS. 3A and 3B.

As described above, in the rear projection television set shown in FIG. 2, an image distorted by the optical system U1B in the image projecting means U1 is projected onto the projection surface U2. If an image DU0 is generated in which the input image DIN is distorted as shown in FIG. 4, with characteristics inverse to the distortion caused by the optical system U1B (the range of the image DU0 is indicated by the character PB in FIG. 4) and is input to the image projecting means U1, the input image DIN is projected on the projection surface U2 without apparent distortion.

The input image DIN can be distorted by enlarging or reducing at least part of the input image DIN in the horizontal direction. Such enlargement or reduction can be achieved by performing a coordinate transformation on the input image DIN to obtain the output image DU0.

As described above, an image can be generated in which the input image DIN is distorted (distortion-corrected) with characteristics inverse to the distortion caused by the optical system U1B, so that the input image DIN can be projected on the projection surface U2 without apparent distortion.

The operation of the image processing apparatus shown in FIG. 1 will now be described in more detail. The image processing apparatus shown in FIG. 1 performs interpolation and a coordinate transformation on an input image D0 (corresponding to the input image DIN in FIG. 2) to generate and output an output image D7 (corresponding to the image DU0 in FIG. 2).

The image data storage means 1 stores the pixel values of the pixels in the input image D0. The input image D0 includes pixels arranged in mutually different first and second directions (for example, horizontal and vertical directions) in a matrix; the output image D7 generated in the image processing apparatus also includes pixels arranged in mutually different first and second directions (for example, horizontal and vertical directions) in a matrix, as in the input image D0.

The pixel positions of the pixels in the input image and output images are expressed by two-dimensional coordinates and the spacing between the pixels in terms of the coordinate values is '1' both in the horizontal and vertical directions.

The correction value storage means 2H holds the data relating to pixel positions that need to be referred to (or assumed to exist) to correct the distortion caused by the optical system U1B.

The data relating to the pixel positions that need to be referred to are data representing the coordinates of at least for some of the pixels in the output image before the coordinate transformation for the image enlargement or reduction, for example, data representing relative positions with respect to the pixel positions in the output image, the relative positions being represented specifically by differences between positions. Since the distortion is corrected by performing an enlargement process or a reduction process according to these differences, the differences are also referred to as 'distortion correction values'.

Figure 5:
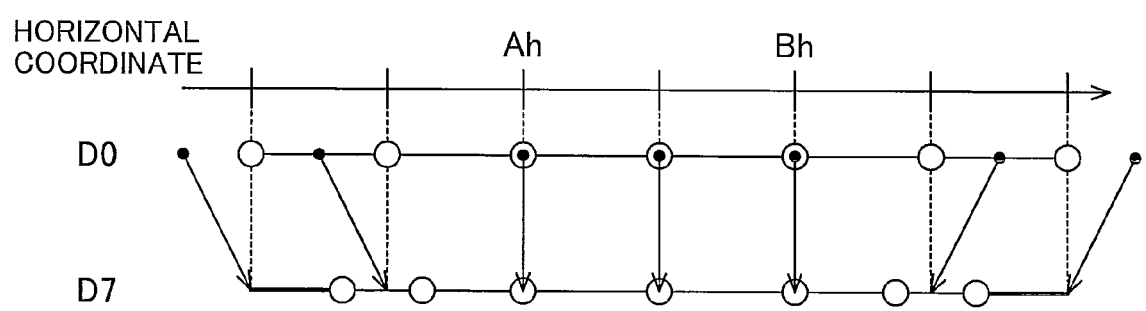
FIG. 5 is a drawing illustrating pixels referred to in a correction for adding the inverse distortion shown in FIG. 4.

FIG. 5 is a drawing illustrating pixel positions that need to be referred to (pixel positions before the coordinate transformation); horizontal coordinates are shown at the top; pixel positions (before the coordinate transformation) in a certain row of the input image D0 and pixel positions (after the coordinate transformation) in the same row of the output image D7 are shown below.

It will be appreciated from FIG. 5 that for a pixel to the left of horizontal coordinate value Ah in the output image D7, a pixel further to the left in the input image D0 should be referred to; for a pixel to the right of horizontal coordinate value Bh, a pixel further to the right in the input image D0 should be referred to; and for a pixel between the horizontal coordinate values Ah and Bh, a pixel at the same position as the pixel itself in the input image D0 should be referred to.

The correction value storage means 2H holds data representing the relative positions of the reference pixels in image D0 for some of the pixels in the output image D7, specifically, data representing how many pixels to the right or left of the pixel located at the same position in image D0 the pixel to be referred to is located. By way of example, when it is appropriate to refer to the pixel located three pixels to the right, the data 'plus 3' are held; when it is appropriate to refer to the pixel located four pixels to the left, the data 'minus 4' are written; when it is appropriate to refer to the pixel at the same coordinate, the data 'zero' are written. In summary, the difference (a positive or negative signed value) between the horizontal coordinate value of each pixel in the output image D7 and the horizontal coordinate value of the pixel to be referred in image D0 (pixel position before the coordinate transformation) is written.

If (data indicating) the distortion correction values of all pixels in the output image D7 were to be held, a huge number (amount) of data would have to be held, so the data are held at predetermined pixel intervals in both the horizontal and vertical directions. In other words, it is possible to reduce the amount of data to be held by taking pixels at predetermined pixel intervals as representative pixels and holding (data indicating) the distortion correction values only of the representative pixels. As described later, for pixels other than the representative pixels, the pixel values of the pixels to be referred to (pixels at positions before the coordinate transformation) are obtained by an interpolation calculation. Therefore, the distortion correction values of the representative pixels are not restricted to integers (numbers representing integral multiples of the pixel interval) but may be real numbers including integer parts and fraction parts. If a pixel located 3.5 pixels to the right needs to be referred to, for example, the value 'plus 3.5' may be set.

Figure 6:
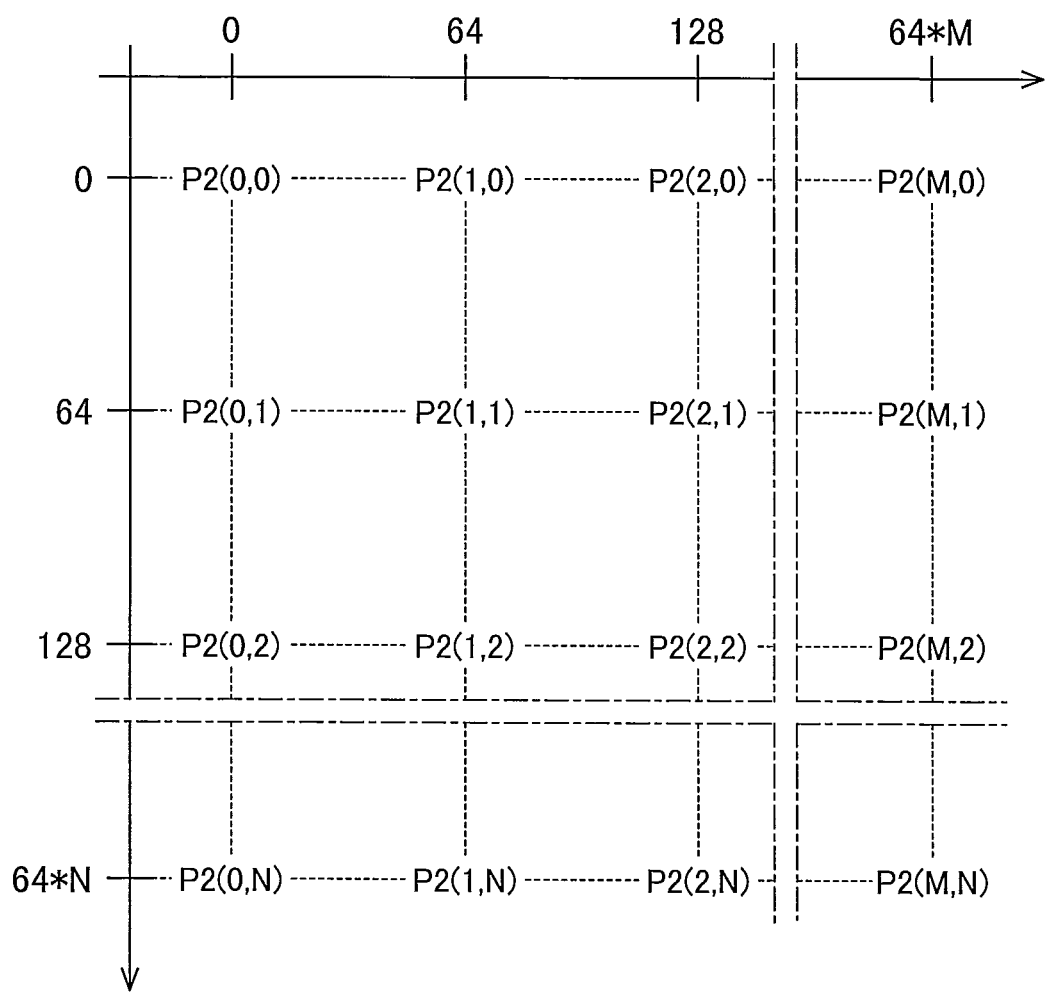
FIG. 6 is a drawing illustrating data held in the correction value storage means 2H.

FIG. 6 shows the distortion correction values P2 of the representative pixels at the positions of the representative pixels, taking an example in which every 64th pixel in both the horizontal and vertical directions in the output image D7 is a representative pixel. If M and N are integers, the positions of the representative pixels are expressed by horizontal coordinates of 64×M and vertical coordinates of 64×N, and the distortion correction values P2 of the representative pixels are expressed as P2(M, N).

The reference pixel position calculation means 3H performs linear interpolation for each pixel in the output image D7, based on the distortion correction values P2(M, N) of the representative pixels held in the correction value storage means 2H, and calculates, for every pixel in the output image D7, the horizontal coordinate U and vertical coordinate V of a pixel position (position before the coordinate transformation) to be referred in the input image D0. That is, for a pixel at a position represented by a horizontal coordinate X=64× J+A and a vertical coordinate Y=64×K+B in the output image D7, the horizontal coordinate U and vertical coordinate V of the reference pixel position (the pixel position before the coordinate transformation) in the input image D0 are calculated by the following equation, where J and K are integers greater than or equal to zero and A and B are integers greater than or equal to zero but not exceeding 63.

$$U = X + \frac{(64-A)\cdot PK0 + A\cdot PK1}{64} \quad (1)$$

$$V = Y$$

where, $$PK0 = \frac{(64-B)\cdot P2(J,K) + B\cdot P2(J,K+1)}{64}$$

$$PK1 = \frac{(64-B)\cdot P2(J+1,K) + B\cdot P2(J+1,K+1)}{64}$$

The coordinates U, V obtained by equation (1) represent an absolute position in the input image D0 and are output as reference pixel position data P3.

Since, from equation (1), U is a real number, it is separated into an integer part and a fraction part. The integer part of U (denoted UINT below) and V give the coordinates (UINT, V), which are input to the image data reading means 5H as data P3INT; the fraction part of U (denoted UDEC below) is input to the interpolation coefficient calculation means 6HA as data P3DEC. UINT may be defined as the maximum integer not exceeding U and UDEC as the value obtained by subtracting UINT from U.

The decision means 4H decides, for each pixel in the output image D7, whether the distortion correction values P2 used in performing the calculation in equation (1) are all zero or not and outputs the result as a flag F4. The flag F4 is set to a first value, for example, a value of '1', when P2(J, K), P2(J+1, K), P2(J, K+1), and P2(J+1, K+1) are all zero and to a second value, for example, a value of '0', in other cases.

The image data reading means 5H outputs, according to the P3INT data, the coordinates of a plurality of pixels, including each pixel and pixels positioned in its vicinity, more specifically, the coordinates of four pixels used in the interpolation calculation described later, as data P5. When coordinates (UINT, V) are input as the P3INT data, the coordinates of four points (coordinates indicating the positions of four pixels in the input image D0) expressed as (UINT−1, V), (UINT, V), (UINT+1, V), and (UINT+2, V) are output as the P5 data. Thus, the image data reading means 5H reads, according to the P3INT data, a plurality of pixels including the pixel at the position indicated by the P3INT data and pixels positioned in its vicinity, for example, pixels to its right and left.

The image data reading means 5H reads from the image data storage means 1, as pixel values D1(−1), D1(0), D1(1), and D1(2), the pixel values D0(UINT−1, V), D0(UINT, V), D0(UINT+1, V), and D0(UINT+2, V) of pixels located in the input image D0 at the four points with the coordinates (UINT−1, V), (UINT, V), (UINT+1, V), and (UINT+2, V) indicated by the P5 data. That is, when i=−1 to 2, the pixel values D0(UINT+i, V) in the input image D0 are read as the pixel values D1(i). The relationship between the pixel values D0(UINT+i, V) in the input image D0 and the read pixel values D1(i) is expressed by the following equation (2).

$$D1(i)=D0(UINT+i,V), i=-1 \text{ to } 2 \quad (2)$$

When there is no pixel at a position represented by the above coordinates in the input image D0, a value indicating black (for example, zero) is output as the pixel value.

Figure 7:
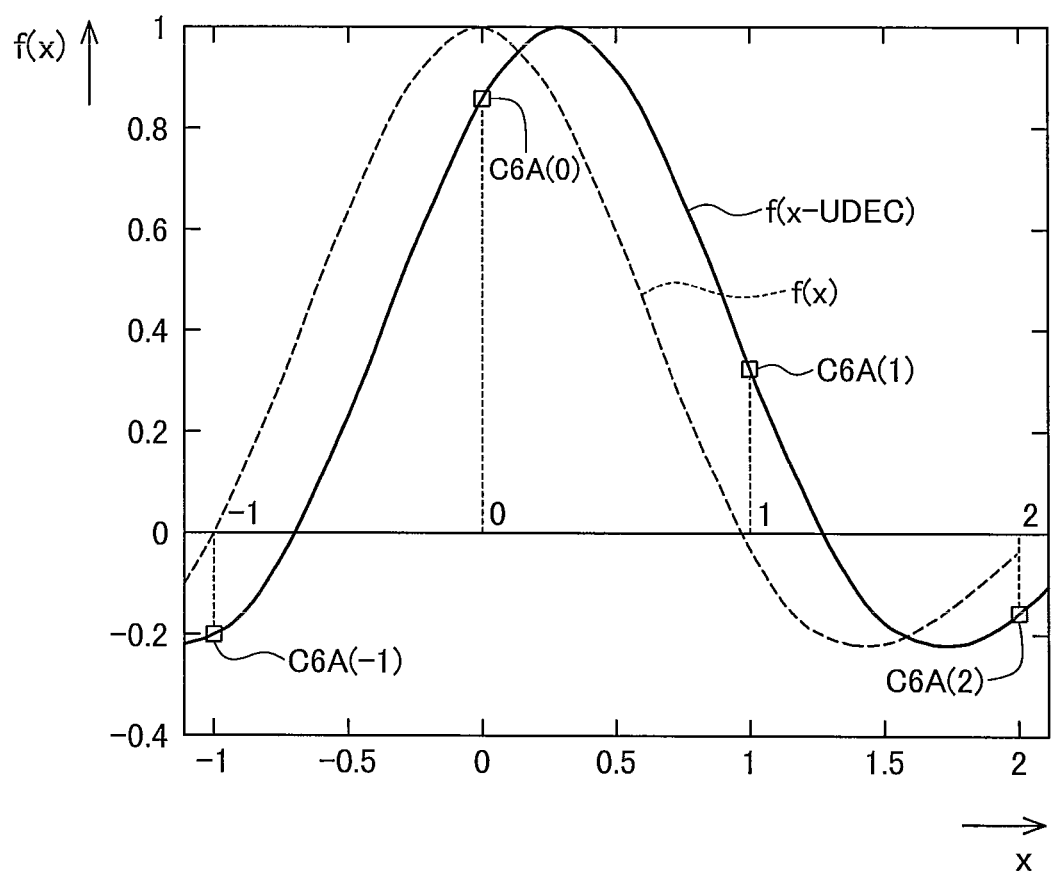
FIG. 7 is a drawing showing examples of interpolation coefficients C6A(i)

The interpolation coefficient calculation means 6HA outputs interpolation coefficients C6A based on the P3DEC data. FIG. 7 is a drawing illustrating how the interpolation coefficients C6A are determined. The interpolation coefficient calculation means 6HA determines the interpolation coefficients C6A, based on a predetermined function f(x) and the P3DEC data. If the value of the P3DEC data is denoted UDEC, the four values C6A(−1), C6A(0), C6A(1), C6A(2) are calculated as follows and output as the interpolation coefficients C6A.

$$C6A(-1)=f(-1-UDEC)$$

$$C6A(0)=f(0-UDEC)$$

$$C6A(1)=f(1-UDEC)$$

$$C6A(2)=f(2-UDEC) \quad (3)$$

In the above equations, the function f(x) satisfies the following condition for an arbitrary value α (0<α<1)

$$(f(-1), f(0), f(1), f(2)) = (0, 1, 0, 0) \cap \sum_{i=-1}^{2} f(i-\alpha) = 1 \quad (4)$$

and is defined, for example, as a function obtained by multiplying the SIN C function by an appropriate window function such as a Hamming window function or a Kaiser window function.

Examples of f(x), f(x−UDEC), C6A(−1), C6A(0), C6A(1), and C6A(2) are shown in FIG. 7.

The coefficient switching means 6HB outputs interpolation coefficients C6 that change according to the values of the data P3DEC and the flag F4. The interpolation coefficients C6 include four values C6(−1), C6(0), C6(1), and C6(2) expressed as follows.

$$C6(i) = \begin{cases} C6A(i) & \text{if } (F4 = 1) \\ C6A(i) & \text{if } (F4 = 0 \cap P3DEC \neq 0) \\ C6B(i) & \text{if } (F4 = 0 \cap P3DEC = 0) \end{cases}, \quad i = -1, 0, 1, 2 \quad (5)$$

In the above equation, C6B(−1), C6B(0), C6B(1), and C6B(2) are predetermined values and are assumed to satisfy the following condition:

$$(C6B(-1), C6B(0), C6B(1), C6B(2)) \neq (0, 1, 0, 0) \cap \sum_{i=-1}^{2} C6B(i) = 1 \quad (6)$$

The interpolation calculation means 7H performs the following interpolation calculation for the pixel at the position represented by coordinates (X, Y) in the output image D7, using image data D1 and a filter expressed by the interpolation coefficients C6.

$$D7(X, Y) = \sum_{i=-1}^{2} C6(i) \cdot D1(i) = \sum_{i=-1}^{2} C6(i) \cdot D0(UINT + i, V) \quad (7)$$

In the above equation (7), the term D0(g, h) represents the pixel value of the pixel at the position given by coordinates (g, h) in the input image D0.

The pixel value D7(X,Y) of the pixel at the position given by the coordinates (X, Y) is thereby obtained. The output image D7 is obtained by performing the above process for all pixels.

The effects of the image processing apparatus according to the first embodiment of the invention will now be described.

FIG. 8 summarizes the values of the interpolation coefficients C6A, C6 obtained by the image processing apparatus according to the first embodiment.

When the condition (condition 1) that all of P2(J, K), P2(J+1, K), P2(J, K+1), and P2(J+1, K+1) are zero is satisfied, or the condition (condition 2) that at least one of P2(J, K), P2(J+1, K), P2(J, K+1), and P2(J+1, K+1) is nonzero but P2(J, K), P2(J+1, K), P2(J, K+1), and P2(J+1, K+1) all satisfy UDEC=0 is satisfied, the interpolation coefficients C6A are as follows:

$$(C6A(-1), C6A(0), C6A(1), C6(2)) = (0, 1, 0, 0) \quad (8)$$

In other cases, they satisfy the following condition:

$$(C6A(-1), C6A(0), C6A(1), C6A(2)) \neq (0, 1, 0, 0) \cap \sum_{i=-1}^{2} C6A(i) = 1 \quad (9)$$

Interpolation coefficients C6 have the following values when and only when the above condition 1 is satisfied:

$$(C6(-1), C6(0), C6(1), C6(2)) = (0, 1, 0, 0) \quad (10)$$

Otherwise, they satisfy the following condition.

$$(C6(-1), C6(0), C6(1), C6(2)) \neq (0, 1, 0, 0) \cap \sum_{i=-1}^{2} C6(i) = 1 \quad (11)$$

FIG. 9 shows the frequency responses of filters with interpolation coefficients obtained from equations (8) and (10) and from equations (9) and (11). The frequency response of a filter expressed by interpolation coefficients satisfying the conditions in equations (8) and (10) is unity over the entire frequency band, as shown by RES1; the frequency characteristic of a filter expressed by interpolation coefficients satisfying the conditions in equations (9) and (11) has a frequency band less than unity on the high-frequency component side, as shown by RES2.

Accordingly, when an image in which a noise component oscillating at a high frequency is added to a solid-color image is input as the input image D0, the noise component oscillating at the high frequency is not removed in regions in which the filter with the interpolation coefficients given by equations (8) and (10) is selected, but is removed in regions in which the filter with the interpolation coefficients given by equations (9) and (11) is selected, because the frequency response in the high-frequency band is less than unity. This results in a partial loss of the signal of the input image DIN, so the brightness of the relevant part of the image is slightly reduced.

FIGS. 10A and 10B show the distribution of pixels with a UDEC value of zero calculated in the region in which the above condition 1 is not satisfied, pixels with UDEC=0 being indicated in black and the other pixels in white. FIG. 10A shows a region in which P2(J, K)=0, P2(J, K+1)=0, P2(J+1, K)=4, and P2(J+1, K+1)=4; FIG. 10B shows a region in which P2(J, K)=1, P2(J, K+1)=4, P2(J+1, K)=0, and P2(J+1, K+1)=2.

As shown in FIG. 10A, regions in which UDEC=0 appear in part of the region in which condition 1 is not satisfied. These regions link together to form lines.

If the coefficient switching means 6HB did not switch over to select the C6B interpolation coefficients in these regions, regions in which the filter with the C6A interpolation coefficients given by equation (8) is selected would appear in small parts of the regions in which the filter with the C6A interpolation coefficients given by equation (9) is selected, and the brightness of the image would become slightly stronger at these points than at other points. If such regions appeared continuously, a pattern of lines extending in a certain direction would appear in the image, causing an image quality problem.

According to the image processing apparatus of the present invention, however, since the coefficient switching means 6HB switches over to select the C6B interpolation coefficients for regions in which condition 1 is not satisfied, the interpolation coefficients are changed to coefficients satisfying equation (11) (as a result of which, the use of interpolation coefficients satisfying equation (11) is maintained even in regions not satisfying condition 1), and patterns due to a difference in filter frequency characteristics as described above do not appear.

In regions satisfying condition 1, the coefficient switching means 6HB does not perform this process (the state in which the first interpolation coefficients C6A are selected is maintained). Since the value of UDEC is always inherently zero in regions satisfying condition 1, there is no case in which only part of the region satisfies UDEC=0 as described above and it is not necessary for the coefficient switching means 6HB to perform a switchover. When the setting satisfies condition 1, if the coordinates (U, V) of the pixel in the input image D0 to be referred to for the pixel at coordinates (x, Y) in the output image D7 are calculated according to equation (1), (U, V)= (X, Y) is obtained. This means that the apparatus is set to refer to the pixel value at the same coordinates in the input image D0, so it is preferable to output the pixel value in the input image D0 itself.

If the interpolation process is actually performed using equations (1) to (9) under condition 1, D7(X, Y)=D0(X, Y) is obtained. In other words, the pixel value in the input image D0 itself is output, so the preferable result is obtained.

Because pixel values at arbitrary positions in the input image D0 can be referred to by the interpolation calculation in the image processing apparatus in the first embodiment, an arbitrary distortion can be created in the horizontal direction. That is, the distortion of any optical system can be corrected in the horizontal direction.

Although the data of four pixels are used in the interpolation by the interpolation calculation means 7H in the above description, the number of pixels used in the interpolation is not limited to four. If the number of pixels used in the interpolation is n+m+1, a function satisfying the following condition, expressed by a delta function δ(i) and an integer i, for an arbitrary α (0<α<1) may be selected:

$$f(i) = \delta(i) \cap f(i-\alpha) \neq \delta(i) \cap \sum_{i=-n}^{m} f(i-\alpha) = 1 \quad (12)$$

The interpolation coefficients C6A may be calculated as follows.

$$C6A(i)=f(i-UDEC), i=-n, -n+1, \ldots, m \quad (13)$$

The interpolation coefficients C6B only need to satisfy the following condition, expressed by the delta function δ(i) and integer i.

$$C6B(i) \neq \delta(i) \cap \sum_{i=-n}^{m} C6B(i) = 1 \quad (14)$$

The delta function is defined as follows.

$$\delta(x) = \begin{cases} 1 & (x = 0) \\ 0 & (x \neq 0) \end{cases} \quad (15)$$

The pixel value D1 (i) read by the image data reading means 5H is defined as follows:

$$D1(i)=D0(UINT+i,v), i=-n, -n+1, \ldots m$$

The interpolation calculation means 7H interpolates the pixel value of the output image D7 as follows:

$$D7(X, Y) = \sum_{i=-n}^{m} C6(i) \cdot D1(i) = \sum_{i=-n}^{m} C6(i) \cdot D0(UINT + i, V)$$

An example has been described above in which every 64th pixel in both the horizontal and vertical directions is a representative pixel and the positions of pixels to be referred to for the representative pixels are stored in the correction value storage means 2H, but the interval between representative pixels is not limited to 64. If the intervals between representative pixels in the horizontal direction and vertical direction are denoted Tx and Ty, respectively, where Tx and Ty are positive integers, if pixels at positions given by coordinates (Tx×M, Ty×N) are selected as representative pixels, and if the distortion correction values P2(M, N) of the representative pixels are stored in the correction value storage means 2H, U may be calculated for the pixel with horizontal coordinate X=Tx×J+A and vertical coordinate Y=Ty×K+B as follows.

$$U = X + \frac{(Tx - A) \cdot PK0 + A \cdot PK1}{Tx} \quad (16)$$

where, $$PK0 = \frac{(Ty - B) \cdot P(J, K) + B \cdot P(J, K + 1)}{Ty}$$

$$PK1 = \frac{(Ty - B) \cdot P(J + 1, K) + B \cdot P(J + 1, K + 1)}{Ty}$$

If Tx and Ty are expressible as powers of two, the divisions included in equation (16) can be accomplished by shift operations. Consequently, there is less of a load when equation (16) is processed in hardware.

In the image processing apparatus according to the present invention it is possible to correct the distortion caused by the optical system U1B by taking at least some of pixels in the output image D7 as representative pixels and, for each representative pixel, writing a positional difference (correction value) between the representative pixel and a pixel to which the representative pixel is referenced in the input image D0 into the correction value storage means 2H in order to distort the input image D0 with characteristics inverse to the distortion caused by the optical system U1B, but the data (correction value data) thus written into the correction value storage means 2H are preferably given values of zero for pixels near the center of the output image D7. The reason is that since the central vicinity of the image is the part the viewer watches with the greatest attention, it is preferable to display the input image itself in this region instead of displaying an image degraded by an interpolation calculation.

As described above, in the image processing apparatus according to the invention, the pixel values in the input image D0 are themselves output in a region surrounded by pixels having zero data written in the correction data storage means 2H (a region satisfying condition 1). Therefore, by setting the data values written into the correction value storage means 2H to zero for pixels around the center of the output image D7, it is possible to display an image having no degradation caused by interpolation calculations in the central vicinity of the image, which people watch with the greatest attention. As write data corresponding to regions other than the central vicinity of the image, for at least some of the pixels in the output image D7, the positional differences between these pixels and the pixels to which these pixels are referenced in the input image D0 in order to distort the input image D0 with characteristics inverse to the distortion caused by the image projecting means U1 are written in the correction value storage means 2H, whereby for the image as a whole, it is possible to output an image D7 in which the distortion caused by the optical system U1B is corrected.

Second Embodiment

Figure 11:
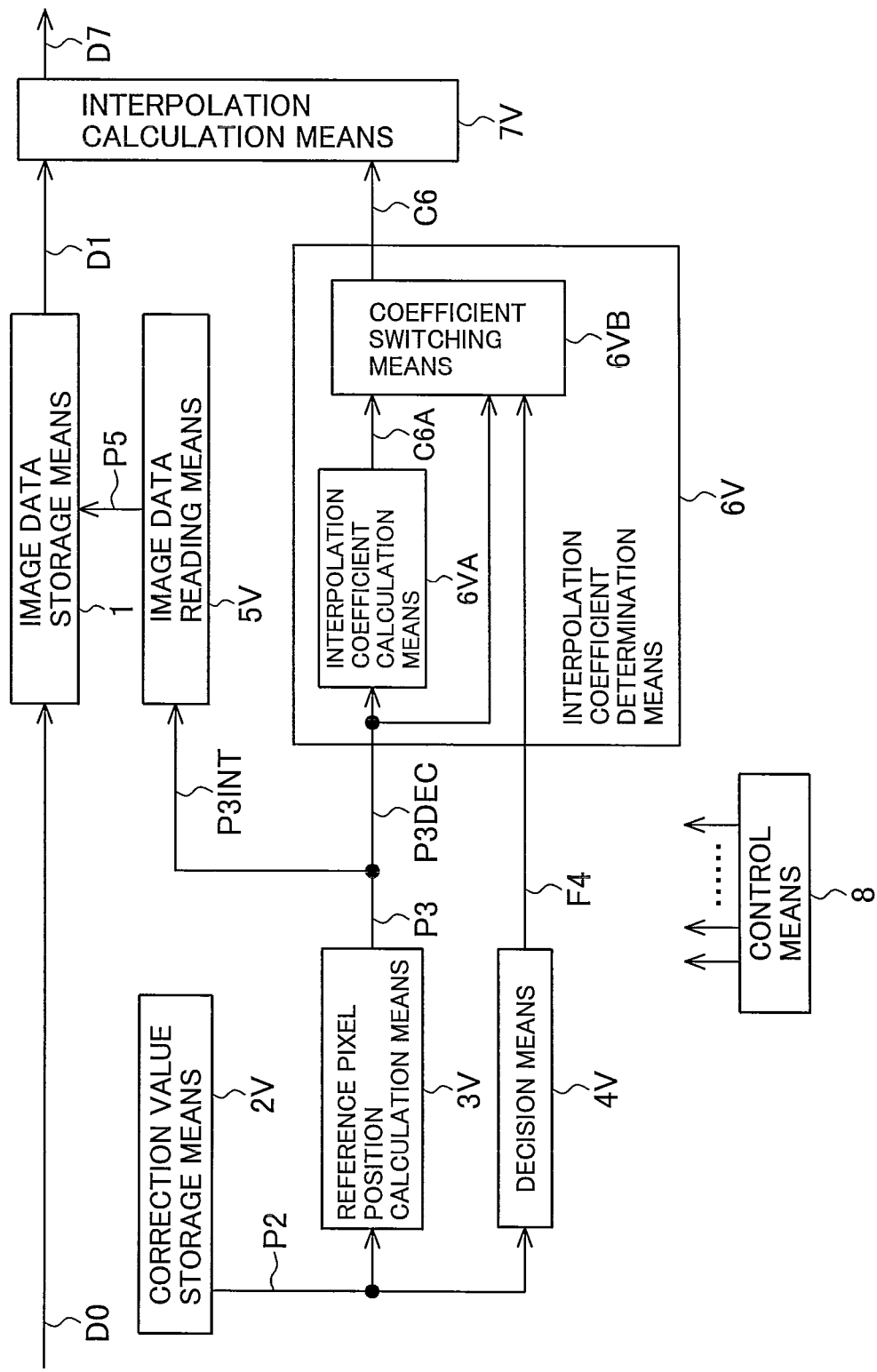
FIG. 11 is a block diagram illustrating an image processing apparatus in a second embodiment of the invention.

FIG. 11 is a drawing illustrating the structure of an image processing apparatus according to the second embodiment of the invention, which is similar to the structure of the image processing apparatus described in the first embodiment.

The image processing apparatus of the second embodiment replaces the correction value storage means 2H, reference pixel position calculation means 3H, decision means 4H, image data reading means 5H, interpolation coefficient determination means 6H, and interpolation calculation means 7H in FIG. 1 with a correction value storage means 2V, a reference pixel position calculation means 3V, a decision means 4V, an image data reading means 5V, an interpolation coefficient determination means 6V, and an interpolation calculation means 7V.

The correction value storage means 2V, reference pixel position calculation means 3V, decision means 4V, image data reading means 5V, interpolation coefficient determination means 6V, and interpolation calculation means 7V are similar to the correction value storage means 2H, reference pixel position calculation means 3H, decision means 4H, image data reading means 5H, interpolation coefficient determination means 6H, and interpolation calculation means 7H, respectively, but differ in the content of their processing because, as described later, enlargement and reduction processes are performed in the vertical direction instead of the horizontal direction.

The image processing apparatus in the second embodiment can also be used as part of an image display apparatus, typically a projection display apparatus such as, for example, the rear projection television set shown in FIG. 2.

Whereas the image processing apparatus according to the first embodiment produces an arbitrary distortion in the horizontal direction, the image processing apparatus according to the second embodiment produces an arbitrary distortion in the vertical direction.

Figure 12A:
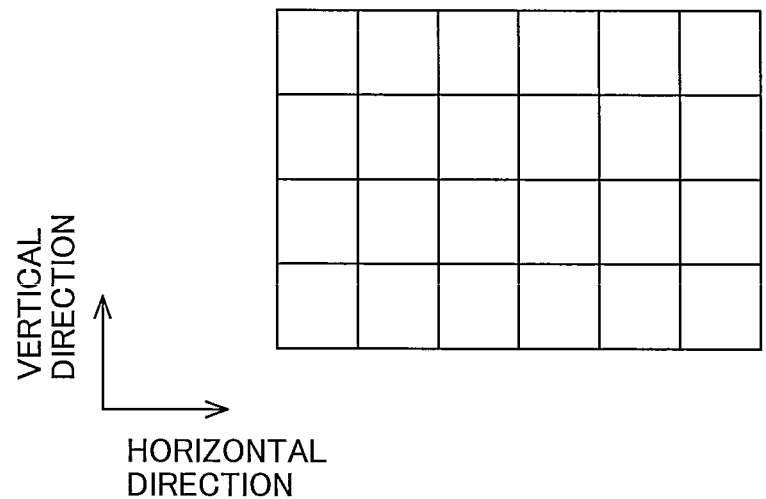
FIGS. 12A and 12B are drawings showing another example of distortion due to an optical system.
Figure 12B:
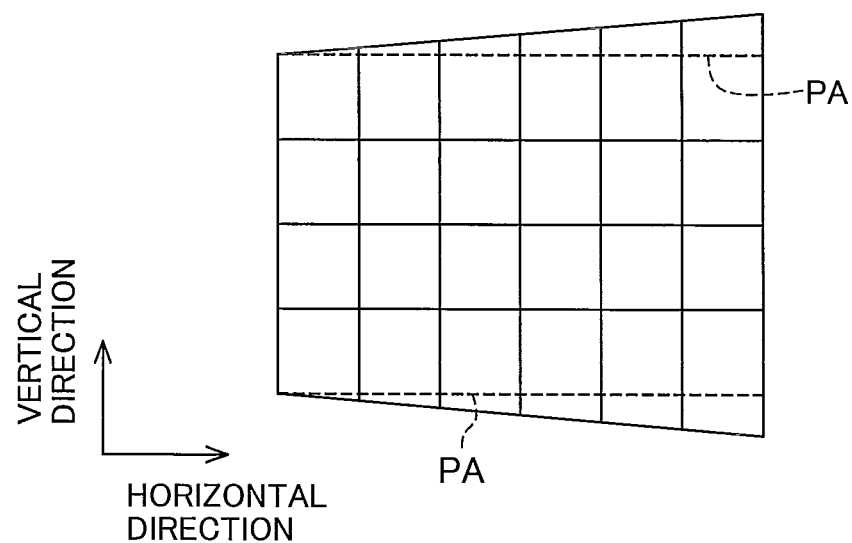

Accordingly, even if the optical system U1B produces distortion in the vertical direction as shown in FIGS. 12A and 12B, for example, it is possible to display an image without distortion on the projection surface U2. FIGS. 12A and 12B are drawings schematically illustrating an example of distortion in the vertical direction by the optical system U1B. A lattice-like image consisting of horizontal lines and vertical lines as shown in FIG. 12A is trapezoidally distorted in the vertical direction by the optical system U1B as shown in FIG. 12B. The dotted line PA shown in FIG. 12B indicates the range of the image displayed on the projection surface U2 when the left edge of the trapezoidal image is adjusted so as to match the width of the projection surface.

Figure 13:
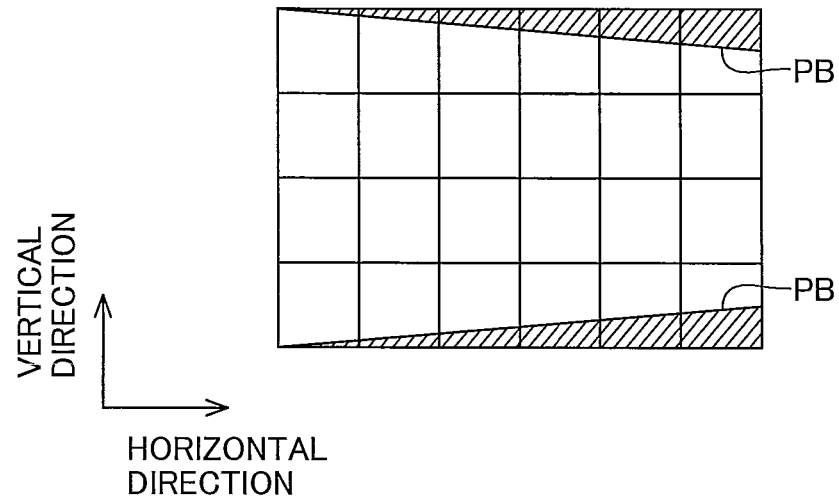
FIG. 13 is a drawing illustrating distortion inverse to the distortion shown in FIG. 12B.

When the optical system U1B has the distortion shown in FIGS. 12A and 12B, if an image DU0 is generated as shown in FIG. 13, in which the input image DIN is distorted with characteristics inverse to the distortion caused by the optical system U1B (the range of the image DU0 is indicated by the character PB in FIG. 13), and is input to the image projecting means U1, the input image DIN is projected on the projection surface U2 without apparent distortion.

The operation of the image processing apparatus according to the second embodiment, shown in FIG. 11, will be described below. The image processing apparatus shown in FIG. 11 performs interpolation and a coordinate transformation on an input image D0 (corresponding to the image DIN in FIG. 2) to output an image D7 (corresponding to the image DU0 in FIG. 2).

The operation of the image processing apparatus U0V will now be described.

The image data storage means 1 stores the pixel values of the pixels in the input image D0.

Figure 14:
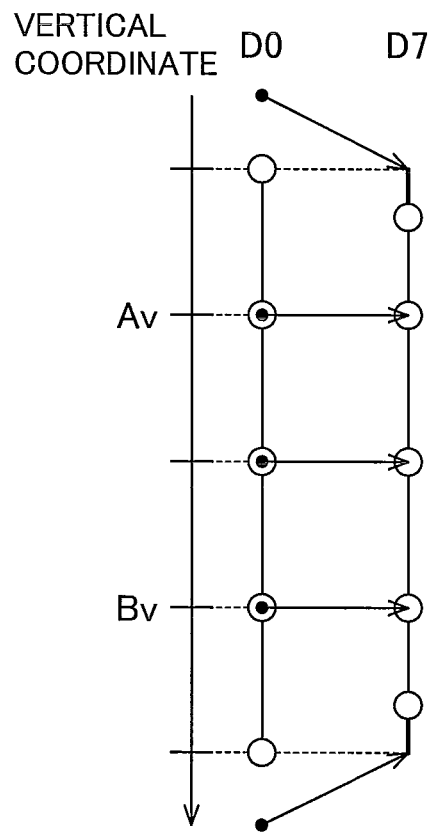
FIG. 14 is a drawing illustrating pixels referred to in a correction for adding the inverse distortion shown in FIG. 13.

The correction value storage means 2V holds the data (distortion correction value data) of pixel positions that need to be referred to (before the coordinate transformation) to correct the distortion caused by the optical system U1B. FIG. 14 is a drawing illustrating pixel positions that need to be referred to; vertical coordinates are shown at the left; pixel positions (before the coordinate transformation) in a certain column in the input image D0 and pixel positions (after the coordinate transformation) in the same column in the output image D7 are shown to the right.

It will be appreciated from FIG. 14 that for a pixel above a vertical coordinate value Av in the output image D7, a pixel further above it in the input image D0 should be referred to; for a pixel below a vertical coordinate value Bv, a pixel further below it in the input image D0 should be referred to; and for a pixel between the vertical coordinate values Av and Bv, a pixel at the same position as the pixel itself in the input image D0 should be referred to.

The correction value storage means 2V holds data representing the relative positions of the reference pixels in image D0 (distortion correction value data) for some of pixels in the output image D7, specifically, data representing how many pixels above or below the pixel located at the same position in image D0 the pixel to be referred to is located. By way of example, when it is appropriate to refer to a pixel located three pixels below, the data 'plus 3' are held; when it is appropriate to refer to a pixel located four pixels above, the data 'minus 4' are written; when it is appropriate to refer to the pixel at the same coordinate, the data 'zero' are written. In summary, the difference (a positive or negative signed value) between the vertical coordinate value of each pixel in the output image D7 and the vertical coordinate value of the pixel to be referred to in image D0 is written.

If the distortion correction values of all pixels in the output image D7 were to be held, a huge number (amount) of data would have to be held, so the data are held at predetermined pixel intervals in both the horizontal and vertical directions. In other words, it is possible to reduce the amount of data to be held by taking pixels at predetermined pixel intervals as representative pixels and holding the distortion correction values only of the representative pixels. As described later, for pixels other than the representative pixels, the pixel values of the pixels to be referred to (pixels at positions before the coordinate transformation) are obtained by an interpolation calculation. Therefore, the distortion correction values of the representative pixels are not restricted to integers (numbers representing integral multiples of the pixel interval) but may be real numbers including integer parts and fraction parts. If a pixel located 3.5 pixels below needs to be referred to, for example, the value 'plus 3.5' may be set.

An example will be described below in which every 64th pixel in both the horizontal and vertical directions is a representative pixel and the distortion correction values P2 of the representative pixels are held in the correction value storage means 2V. If M and N are integers, the positions of the representative pixels are expressed by horizontal coordinates of 64×M and vertical coordinates of 64×N, and the distortion correction values P2 of the representative pixels are expressed as P2(M, N), as shown in FIG. 6.

The reference pixel position calculation means 3V performs linear interpolation for each pixel in the output image D7, based on the distortion correction values P2(M, N) of the representative pixels held in the correction value storage means 2V, and calculates, for every pixel in the output image D7, the horizontal coordinate U and vertical coordinate V of a pixel position (position before the coordinate transformation) to be referred in the input image D0. That is, for a pixel at a position represented by a horizontal coordinate X=64× J+A and a vertical coordinate Y=64×K+B in the output image D7, the horizontal coordinate U and vertical coordinate V of the reference pixel position (the position before the coordinate transformation) in the input image D0 are calculated by the following equation, where J and K are integers greater than or equal to zero and A and B are integers greater than or equal to zero but not exceeding 63.

$$U = X \quad (17)$$
$$V = Y + \frac{(64-B) \cdot PK0 + A \cdot PK1}{64}$$
where,
$$PK0 = \frac{(64-A) \cdot P(J, K) + A \cdot P(J+1, K)}{64}$$
$$PK1 = \frac{(64-A) \cdot P(J, K+1) + A \cdot P(J+1, K+1)}{64}$$

The coordinates U, V obtained by equation (17) represent an absolute position in the input image D0 and are output as reference pixel position data P3.

Since V in equation (17) is a real number, it is separated into an integer part and a fraction part. The integer part of V (denoted VINT below) and U give the coordinates (U, VINT), which are input to the image data reading means 5V as data P3INT; the fraction part of V (denoted VDEC below) is input to the interpolation coefficient calculation means 6VA as data P3DEC. VINT may be defined as the maximum integer not exceeding V and VDEC as the value obtained by subtracting VINT from V.

The decision means 4V operates in the same way as the decision means 4H in the first embodiment, so a detailed description will be omitted.

The image data reading means 5V outputs, according to the P3INT data, the coordinates of four pixels as data P5, which are used in an interpolation calculation described later. When coordinates (U, VINT) are input as the P3INT data, the coordinates of four points (coordinates indicating the positions of four pixels in the input image D0) expressed as (U, VINT−1), (U, VINT), (U, VINT+1), and (U, VINT+2) are output as the P5 data. Thus, the image data reading means 5V reads, according to the P3INT data, a plurality of pixels including the pixel at the position indicated by the P3INT data and pixels positioned in its vicinity, for example, pixels above and below it.

The image data reading means 5V reads from the image data storage means 1, as pixel values D1(−1), D1(0), D1(1), and D1(2), the pixel values D0(U, VINT−1), D0(U, VINT), D0(U, VINT+1), and D0(U, VINT+2) of pixels located in the input image D0 at the four points with the coordinates (U, VINT−1), (U, VINT), (U, VINT+1), and (U, VINT+2) indicated by the P5 data. That is, when i=−1 to 2, the pixel values D0(U, VINT+i) in the input image D0 are read as the pixel values D1(i). The relationship between the pixel values D0(U, VINT+i) in the input image D0 and the read pixel values D1(i) is expressed by the following equation (18).

$$D1(i)=D0(U, VINT+i), i=-1 \text{ to } 2 \quad (18)$$

When there is no pixel at a position represented by the above coordinates in the input image D0, a value indicating black (for example, zero) is output as the pixel value.

The interpolation coefficient calculation means 6VA operates in the same way as the interpolation coefficient calculation means 6HA in the first embodiment. More specifically, the interpolation coefficients C6A output by the interpolation coefficient calculation means 6VA are the four values C6A(−1), C6A(0), C6A(1), and C6A(2) expressed by replacing UDEC in equation (3) with VDEC.

The coefficient switching means 6VB operates in the same way as the coefficient switching means 6HB in the first embodiment, so a detailed description will be omitted.

The interpolation calculation means 7V performs the following interpolation calculation for the pixel at the position represented by coordinates (X, Y) in the output image D7, using image data D1 and a filter expressed by the interpolation coefficients C6.

$$D7(X, Y) = \sum_{i=-1}^{2} C6(i) \cdot D1(i) = \sum_{i=-1}^{2} C6(i) \cdot D0(U, VINT+i) \quad (19)$$

The pixel value D7(X, Y) of the pixel at the position given by the coordinates (X, Y) is thereby obtained. The output image D7 is obtained by performing the above process for all pixels.

Since the image processing apparatus according to the second embodiment can perform the same processing as the image processing apparatus according to the first embodiment but in the vertical direction, the same effects are obtained in the vertical direction of an image as the effects obtained in the horizontal direction of the image by the image processing apparatus according to the first embodiment.

It goes without saying that the modifications described in the first embodiment can also be applied to the image processing apparatus according to the second embodiment.

Third Embodiment

Figure 15:
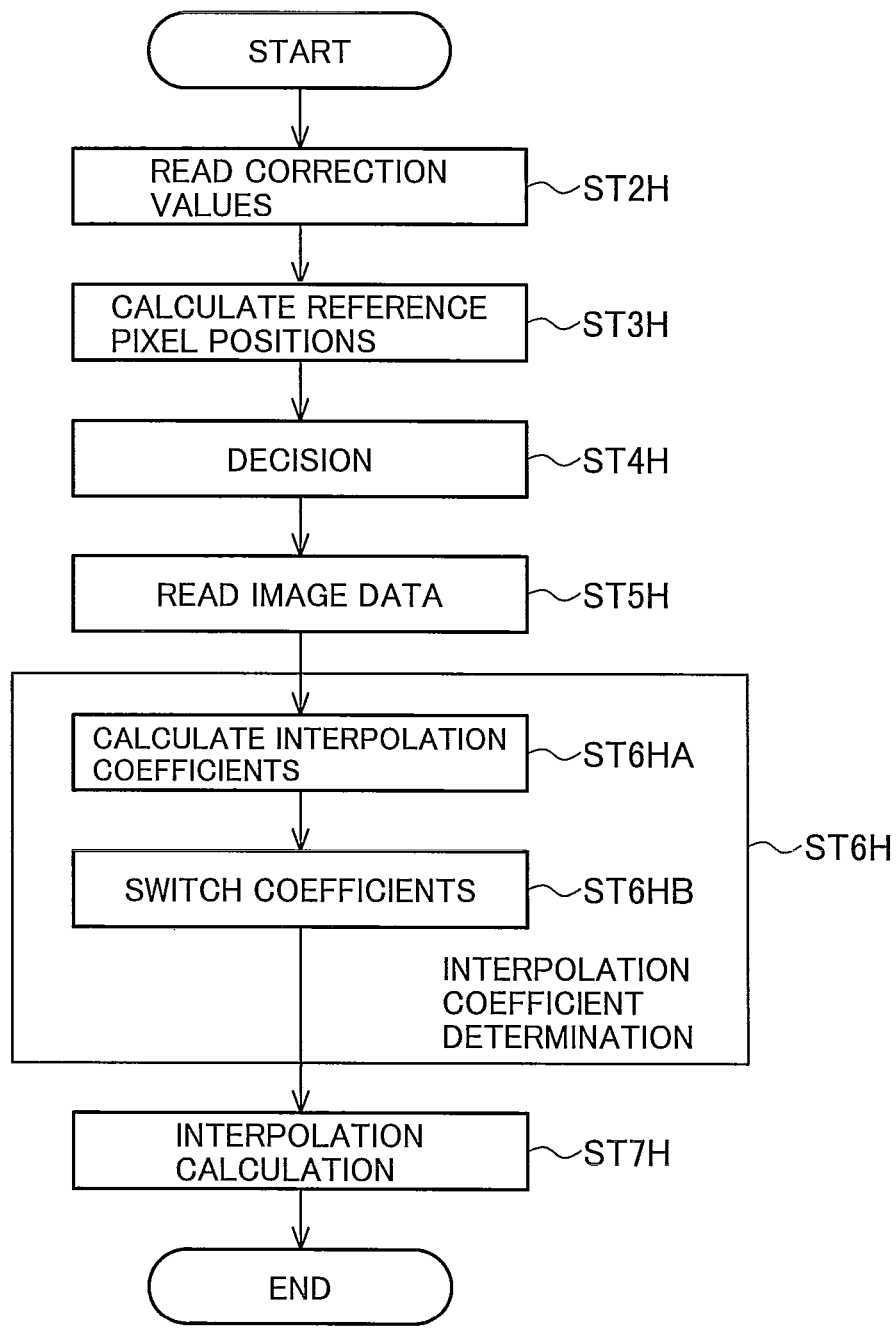
FIG. 15 is a flowchart illustrating the image processing method in a third embodiment.

FIG. 15 is a flowchart illustrating the image processing method according to the third embodiment of the invention. The image processing method of the third embodiment can be used as part of an image display apparatus, a typical example being a projection display apparatus. For example, image processing may be executed by the image processing method of the third embodiment in the image processing apparatus U0 of the rear projection television set shown in FIG. 2.

The image processing method shown in FIG. 15 comprises a correction value reading step ST2H, a reference pixel position calculation step ST3H, a decision step ST4H, an image data reading step ST5H, an interpolation coefficient determination step ST6H, and an interpolation calculation step ST7H.

The interpolation coefficient determination step ST6H includes an interpolation coefficient calculation step ST6HA and a coefficient switching step ST6HB.

The operation of the image processing method of the third embodiment shown in FIG. 15 will now be described. In the description below, the images input to and output from the image processing method of the third embodiment are denoted input image D0 and output image D7, respectively.

The correction value reading step ST2H reads, for representative pixels in the output image D7, the distortion correction values P2 held in the correction value storage means 2H shown in FIG. 1.

The reference pixel position calculation step ST3H obtains the values U, V for each pixel in the output image D7 by performing the calculation in equation (1) on the basis of the distortion correction values P2 read in the correction value reading step ST2H. The value U is a real number, so its integer and fraction parts will be denoted UINT and UDEC, respectively.

The decision step ST4H decides, for each pixel in the output image D7, whether the distortion correction values P2(J, K), P2 (J+1, K), P2(J, K+1), and P2(J+1, K+1) used in the calculation in equation (1) are all zero or not and outputs the result as a flag F4. The flag F4 is set to a first value, for example, a value of '1', when P2(J, K), P2(J+1, K), P2(J, K+1), and P2(J+1, K+1) are all zero and to a second value, for example, a value of '0', in other cases.

The image data reading step ST5H reads the following pixel values in the input image D0 from the image data storage means 1 in FIG. 1, based on the values U, V calculated by equation (1), and outputs them: the pixel value D0(UINT, V) of the pixel at the position represented by coordinates (UINT, V); the pixel value D0(UINT−1, V) of the pixel at the position represented by coordinates (UINT−1, V); the pixel value D0(UINT+1, V) of the pixel at the position represented by coordinates (UINT+1, V); and the pixel value D0(UINT+2, V) of the pixel at the position represented by coordinates (UINT+2, V). Thus, the image data reading step ST5H reads, according to the P3INT data, a plurality of pixels including the pixel at the position indicated by the P3INT data and pixels in its vicinity, for example, pixels to its right and left. When there is no pixel at a position represented by the above coordinates in the input image D0, a value indicating black (for example, zero) is output as the pixel value.

The interpolation coefficient calculation step ST6HA outputs interpolation coefficients C6A obtained by equation (3) on the basis of the UDEC data. The method of obtaining the interpolation coefficients C6A is the same as in the interpolation coefficient calculation means 6HA in the first embodiment, so a detailed description will be omitted.

The coefficient switching step ST6HB outputs interpolation coefficients C6 that change according to the values of the data P3DEC and the flag F4. The interpolation coefficients C6 are obtained from equation 5. The method of obtaining the interpolation coefficients C6 is the same as in the coefficient switching means 6HB in the first embodiment, so a detailed description will be omitted.

The interpolation calculation step ST7H performs the following interpolation calculation for the pixel at the position represented by coordinates (X, Y) in the output image D7, using pixel values in the input image D0 and a filter expressed by the interpolation coefficients C6.

$$D7(X, Y) = \sum_{i=-1}^{2} C6(i) \cdot D0(UINT + i, V) \quad (20)$$

The pixel value D7(X, Y) of the pixel at the position given by the coordinates (X, Y) is thereby obtained. The output image D7 is obtained by performing the above process for all pixels.

Since the image processing method according to the third embodiment can perform the same processing as the image processing apparatus according to the first embodiment, the same effects are obtained as from the image processing apparatus according to the first embodiment. The same modifications can also be made as for the image processing apparatus according to the first embodiment. It is also possible to use the output image D7 obtained in the above processing as the image DU0 in the image display apparatus shown in FIG. 2.

Fourth Embodiment

Figure 16:
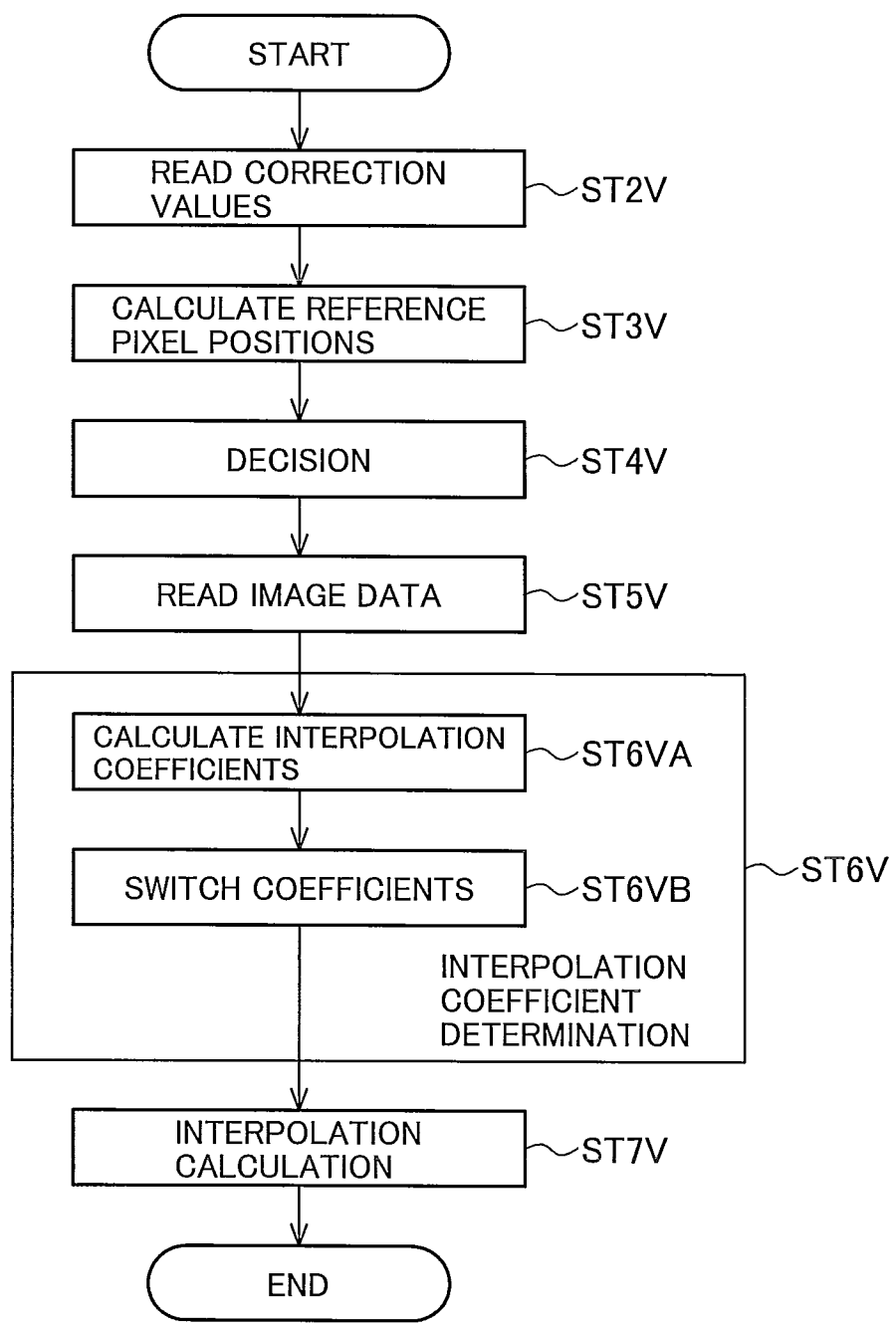
FIG. 16 is a flowchart illustrating the image processing method in a fourth embodiment.

FIG. 16 is a flowchart illustrating the image processing method according to the fourth embodiment of the invention. The image processing method of the fourth embodiment can also be used as part of an image display apparatus, a typical example being a projection display apparatus. For example, image processing may be executed by the image processing method of the fourth embodiment in the image processing apparatus U0 of the rear projection television set shown in FIG. 2.

The image processing method shown in FIG. 16 comprises a correction value reading step ST2V, a reference pixel position calculation step ST3V, a decision step ST4V, an image data reading step ST5V, an interpolation coefficient determination step ST6V, and an interpolation calculation step ST7V.

The interpolation coefficient determination step ST6V includes an interpolation coefficient calculation step ST6VA and a coefficient switching step ST6VB.

The correction value reading step ST2V, reference pixel position calculation step ST3V, decision step ST4V, image data reading step ST5V, interpolation coefficient determination step ST6V, and interpolation calculation step ST7V are similar to the correction value reading step ST2H, reference pixel position calculation step ST3H, decision step ST4H, image data reading step ST5H, interpolation coefficient determination step ST6H, and interpolation calculation step ST7H in the third embodiment, respectively, but differ in the following respect because the enlarging or reducing direction is the vertical direction instead of the horizontal direction.

The operation of the image processing method of the fourth embodiment shown in FIG. 16 will now be described. In the description below, the images input to and output from the image processing method of the fourth embodiment are denoted input image D0 and output image D7, respectively.

The correction value reading step ST2V reads, for representative pixels in the output image D7, the distortion correction values P2 held in the correction value storage means 2V shown in FIG. 11.

The reference pixel position calculation step ST3V obtains the values U, V for each pixel in the output image D7 by performing the calculation in equation (17) on the basis of the distortion correction values P2 read in the correction value reading step ST2V. The value V is a real number, so its integer and fraction parts will be denoted VINT and VDEC, respectively. The zero decision step ST4V decides, for each pixel in the output image D7, whether the distortion correction values P2(J, K), P2(J+1, K), P2(J, K+1), and P2(J+1, K+1) used in the calculation in equation (17) are all zero or not and outputs the result as a flag F4. The flag F4 is set to a first value, for example, a value of '1', when P2(J, K), P2(J+1, K), P2(J, K+1), and P2(J+1, K+1) are all zero and to a second value, for example, a value of '0', in other cases.

The image data reading step ST5V reads the following pixel values in the input image D0 from the image data storage means 1 in FIG. 11, based on the values U, V calculated by equation (17), and outputs them: the pixel value D0(U, VINT) of the pixel at the position represented by coordinates (U, VINT); the pixel value D0(U, VINT−1) of the pixel at the position represented by coordinates (U, VINT−1); the pixel value D0(U, VINT+1) of the pixel at the position represented by coordinates (U, VINT+1); and the pixel value D0(U, VINT+2) of the pixel at the position represented by coordinates (U, VINT+2). Thus, the image data reading step ST5V reads, according to the P3INT data, a plurality of pixels including the pixel at the position indicated by the P3INT data and pixels in its vicinity, for example, pixels above and below it. When there is no pixel at a position represented by the above coordinates in the input image D0, a value indicating black (for example, zero) is output as the pixel value.

The interpolation coefficient calculation step ST6VA obtains interpolation coefficients C6A from the VDEC data. The method of obtaining the interpolation coefficients C6A is the same as in the interpolation coefficient calculation means 6VA in the second embodiment, so a detailed description will be omitted.

The coefficient switching step ST6VB outputs interpolation coefficients C6 that change according to the values of the data P3DEC and the flag F4. The method of obtaining the interpolation coefficients C6 is the same as in the coefficient switching means 6VB in the second embodiment, so a detailed description will be omitted.

The interpolation calculation step ST7V performs the following interpolation calculation on the pixel at the position represented by coordinates (X, Y) in the output image D7, using pixel values in the input image D0 and a filter expressed by the interpolation coefficients C6.

$$D7(X, Y) = \sum_{i=-1}^{2} C6(i) \cdot D0(U, VINT + i) \quad (21)$$

The pixel value D7(X, Y) of the pixel at the position given by the coordinates (X, Y) is thereby obtained. The output image D7 is obtained by performing the above process for all pixels.

Since the image processing method according to the fourth embodiment can perform the same processing as the image processing apparatus according to the second embodiment, the same effects are obtained as from the image processing apparatus according to the second embodiment. The same modifications can also be made as for the image processing apparatus according to the second embodiment. It is also possible to use the output image D7 obtained in the above processing as the image DU0 in the image display apparatus shown in FIG. 2.

Fifth Embodiment

Figure 17:
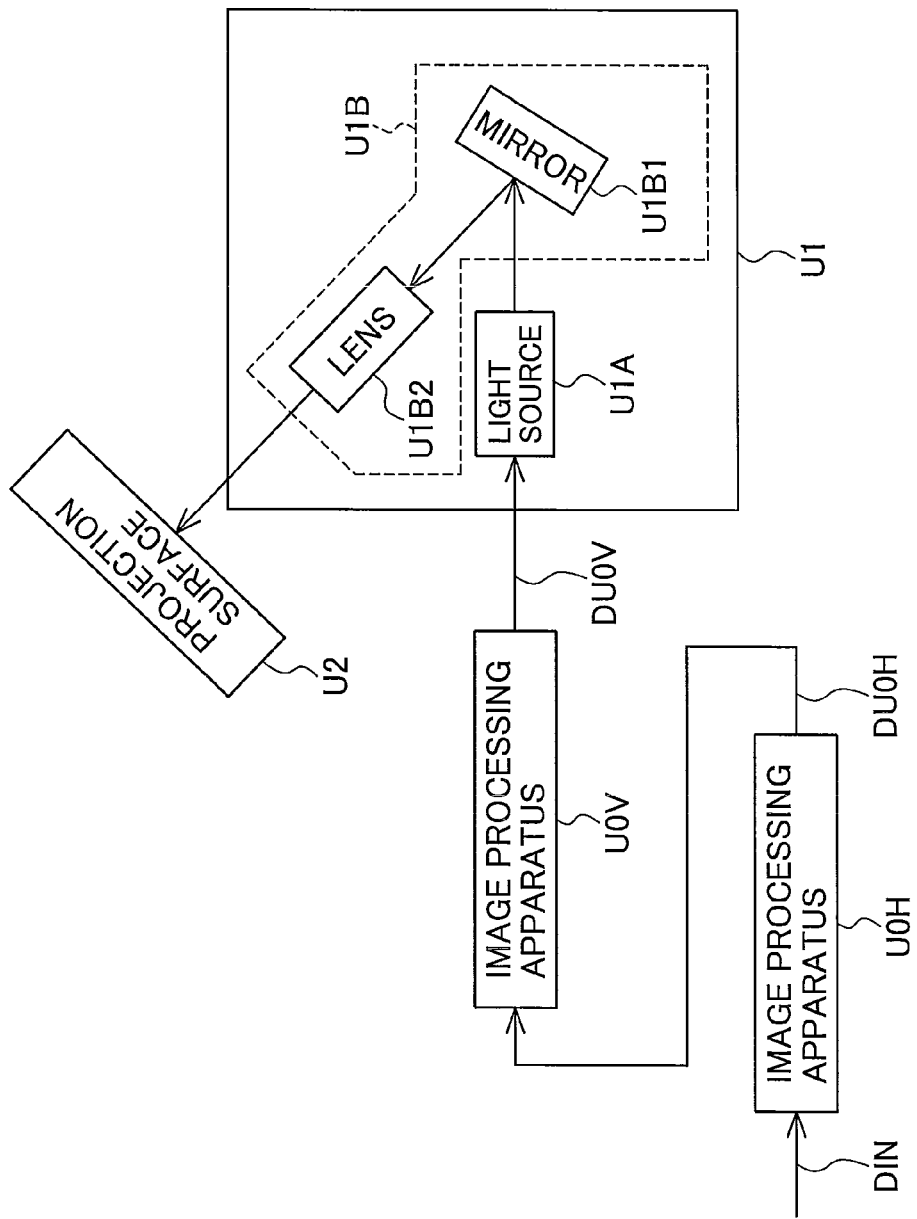
FIG. 17 is a block diagram illustrating the image display apparatus in a fifth embodiment.

FIG. 17 is a block diagram illustrating an image display apparatus according to the fifth embodiment of the invention. The image display apparatus shown in FIG. 17 comprises an image processing apparatus UGH, an image processing apparatus U0V, an image projecting means U1, and a projection surface U2. The image projecting means U1 includes a light source U1A and an optical system U1B, which includes a mirror U1B1 and a lens U1B2.

In the rear projection television set shown in FIG. 17, a picture corresponding to an input image DIN is projected onto the projection surface U2 by the following procedure. First, image processing apparatus U0H outputs an image DU0H generated according to the procedure described in the first embodiment or the third embodiment. Next, image processing apparatus U0V outputs an image DU0V generated according to the procedure described in the second embodiment or the fourth embodiment.

Then, the light source U1A outputs light corresponding to the image DU0V, and the light output from the light source U1A is projected onto the projection surface U2 through the optical system U1B including the mirror U1B1 and the lens U1B2.

In the image display apparatus according to the fifth embodiment, image processing apparatus U0H corrects the distortion that the optical system U1B produces in the horizontal direction and image processing apparatus U0V corrects the distortion that the optical system U1B produces in the vertical direction. Accordingly, even if the optical system U1B produces distortion in both the horizontal and vertical directions, it is possible to display a distortion-free image on the projection surface U2.

The order of arrangement of the image processing apparatus U0H and the image processing apparatus U0V may be altered. That is, the image processing apparatus U0V may be provided to vertically enlarge or reduce the input image, DIN according to the procedure described in the second embodiment, and the image processing apparatus U0H may be provided to horizontally enlarge or reduce the image output from the image processing apparatus U0V according to the procedure described in the first embodiment.

Instead of using the combination of the image processing apparatus described in the first embodiment and the image processing apparatus described in the second embodiment, the combination of the image processing method described in the third embodiment and the image processing method described in the fourth embodiment may be used. That is, the image display apparatus may be configured to display an image after carrying out enlargement or reduction by the image processing method described in the third embodiment, and enlargement or reduction by the image processing method described in the fourth embodiment, one after another.

Although the above embodiments, with reference to FIG. 9, have described a case in which the frequency response RES2 of the linear filter expressed by the third interpolation coefficients is less than unity in the high-frequency region, the invention is not limited to this case; it is also applicable when the frequency response RES2 of the linear filter expressed by the third interpolation coefficients is less than unity in at least some part of the frequency region.

The first and third embodiments have described a case in which an image is enlarged or reduced in the horizontal direction, and the second and fourth embodiments have described a case in which an image is enlarged or reduced in the vertical direction, but the invention does not limit the enlargement or reduction method to one of the horizontal and vertical directions; it is also applicable to cases in which, from the input image D0 having pixels arranged in mutually different first and second directions in a matrix, at least part of the input image is enlarged or reduced in a first direction to generate the output image D7. When this generalization is made, to avoid confusion in the meaning of symbols, the characters Q, S, Ts indicating the values of coordinates and the like in the first direction can be used in place of the characters U, X, Tx indicating the values of coordinates and the like in the horizontal direction in the first and third embodiments and the characters V, Y, Ty indicating the values of coordinates and the like in the vertical direction in the second and fourth embodiments; the characters R, T, Tt indicating the values of coordinates and the like in a second direction can be used in place of the characters V, Y, Ty indicating the values of coordinates and the like in the vertical direction in the first and third embodiments and the characters U, X, Tx indicating the values of coordinates and the like in the horizontal direction in the second and fourth embodiments. In this case, the function and operation of each means are expressed as follows.

The correction value storage means (corresponding to the correction value storage means 2H in the first embodiment or the correction value storage means 2V in the second embodiment) holds the correction values P2(M, N) for the pixels at positions represented by coordinates (Ts×M, Tt×N) in the output image, where Ts and Tt are positive integers and M and N are integers greater than or equal to zero.

The reference pixel position calculation means (corresponding to the reference pixel position calculation means 3H in the first embodiment or the reference pixel position calculation means 3V in the second embodiment) determines, in order to determine the pixel value of each pixel in the output image D7, a position (Q, R) in the input image D0 before the coordinate transformation by an interpolation calculation using the correction values P2(S, T) for the representative pixels and outputs the result as a reference pixel position (QINT, R; QDEC). QINT may be defined as the maximum integer not exceeding Q and QDEC as the value obtained by subtracting QINT from Q.

The reference pixel position calculation means (3H, 3V) determines, for a pixel at a position represented by coordinates (S, T), for example, in the output image D7, coordinates (Q, R) representing the position before the coordinate transformation by the following interpolation calculation, in which S and T are coordinates in the output image D7, J is the quotient when S is divided by Ts; A is the remainder when S is divided by Ts, K is the quotient when T is divided by Tt, and B is the remainder when T is divided by Tt.

$$Q = S + \frac{(Ts - A) \cdot PK0 + A \cdot PK1}{Ts} \qquad (22)$$

$$R = T$$

where, $$PK0 = \frac{(Tt - B) \cdot P2(J, K) + B \cdot P2(J, K+1)}{Tt}$$

$$PK1 = \frac{(Tt - B) \cdot P2(J+1, K) + B \cdot P2(J+1, K+1)}{Tt}$$

The above equation (22) corresponds to equation (1) in the description of the first embodiment and equation (17) in the description of the second embodiment.

The decision means (corresponding to the decision means 4H in the first embodiment or the decision means 4V in the second embodiment) decides, for a pixel at a position represented by coordinates (S, T) in the output image D7, that the above condition is satisfied if the correction values P2(J, K), P2(J+1, K), P2(J, K+1), and P2(J+1, K+1) are all zero, and otherwise decides that the above condition is not satisfied.

The image data reading means (corresponding to the image data reading means 5H in the first embodiment or the image data reading means 5V in the second embodiment) reads from the image data storage means 1, for each pixel in the output image D7, the pixel values of a plurality of pixels including said each pixel and pixels positioned in its vicinity, according to the values (QINT, R) of a reference pixel position.

If the pixel value of the pixel at the position represented by coordinates (g, h) in the input image D0 is denoted D0(g, h), the integer part of the coordinate Q in the first direction is denoted QINT, and n and m are integers greater than or equal to zero, for example, the image data reading means (5H, 5V) reads n+m+1 pixel values D1(i) given by the following equation from the image data storage means 1.

$$D1(i) = D0(QINT+i, R), \; i=-n, -n+1, \ldots, m \qquad (23)$$

The above equation (23) corresponds to equation (2) in the description of the first embodiment and equation (18) in the description of the second embodiment.

If the fraction part of the coordinate Q in the first direction is denoted QDEC, the interpolation coefficient determination means (6H, 6V) determines n+m+1 first interpolation coefficients C6(i) from the value of QDEC and the output result of the decision means (4H, 4V).

If the predetermined function is denoted f(x), the interpolation coefficient calculation means (6HA, 6VA) in the interpolation coefficient determination means (6H, 6V) determines, as second interpolation coefficients, n+m+1 coefficients C6A(i) given by the following interpolation coefficient calculation equation using the value of the fraction part QDEC of the coordinate Q in the first direction and the predetermined function f(x).

$$C6A(i) = f(i - QDEC), \; i=-n, -n+1, \ldots, m \qquad (24)$$

The above equation (24) corresponds to equation (13) in the description of the first embodiment.

In this case, a linear filter coefficients whose frequency response is unity for all frequencies when and only when the value of the fraction part of QDEC of the coordinate Q in the first direction is zero may be used as the second interpolation coefficients determined from the above interpolation coefficient calculation equation.

The interpolation coefficients C6B(i) are defined by the following equation using the delta function δ(x) and an integer i:

$$C6B(i) \neq \delta(i) \cap \sum_{i=-n}^{m} C6B(i) = 1$$

The first interpolation coefficients C6(i) can be determined by a method similar to that of equation (5).

The interpolation calculation means (corresponding to the interpolation calculation means 7H in the first embodiment or the interpolation calculation means 7V in the second embodiment) obtains the pixel value D7(S, T) in the output image D7 from a plurality of pixel values D0(QINT+i, R) (i=−n to m) and the first interpolation coefficients C6.

For example, the interpolation calculation means (7H, 7V) obtains the pixel value D7(S, T) from the pixel values D1(i) and the first interpolation coefficients C6(i) by using the following equation.

$$D7(S, T) = \sum_{i=-n}^{m} C6(i) \cdot D1(i) \qquad (25)$$

The above equation (25) corresponds to equation (7) in the description of the first embodiment and equation (19) in the description of the second embodiment.

When the terms "first direction" and the "second direction" are used, the fifth embodiment can be generalized as follows. That is, the image display apparatus may use two image processing apparatus according to the first and second embodiments. A first one of the image processing apparatus is used for enlarging or reducing the input image in a first direction (e.g., one of the horizontal and vertical directions), and a second one of the image processing apparatus is used for enlarging or reducing the image output from the first image processing apparatus, in a second direction (e.g., the other of the horizontal and vertical directions).

Similarly, the image display apparatus may use two image processing methods according to the third and fourth embodiments. A first one of the image processing methods is used for enlarging or reducing the input image in a first direction (e.g., one of the horizontal and vertical directions), and a second one of the image processing methods is used for enlarging or reducing the image output from the first image processing apparatus, in a second direction (e.g., the other of the horizontal and vertical directions).

The applications in which the image processing apparatus and methods described in the first to fifth embodiments of the invention may be used are not limited to part of a projection display apparatus. They may be used in any application that enlarges or reduces at least part of an input image.

What is claimed is:

1. An image processing apparatus comprising:
a processor that generates an output image from an input image having pixels arranged in mutually different first and second directions in a matrix, at least part of the input image being enlarged or reduced in the output image,
the at least part of the input image being enlarged or reduced by determining a pixel value of a pixel assumed to exist at a position in the input image before the enlarging or reducing coordinate transformation, and using the pixel value thus determined as a pixel value of the output image,
the image processing apparatus further comprising:
an image data storage unit configured to hold the pixel values of the pixels in the input image;
a correction value storage unit configured to hold, as correction values, for each of at least some of the pixels in the output image being used as representative pixels, a difference between the coordinate of the pixel in the first direction and the coordinate in the first direction before the coordinate transformation in the input image, for use in determining the pixel value of said each of the representative pixels;
a reference pixel position calculation unit configured to determine using said processor a position of each pixel in the input image before the coordinate transformation by an interpolation calculation using the correction values for the representative pixels, in order to determine the pixel value of said each pixel in the output image, and output the result as a reference pixel position;
a decision unit configured to decide using said processor, for each pixel in the output image, whether or not the correction values used in the interpolation calculation satisfy a predetermined condition;
an image data reading unit configured to read from the image data storage unit, for each pixel in the output image, the pixel values of a plurality of pixels including said each pixel and pixels positioned in its vicinity, according to values of their reference pixel positions;
an interpolation coefficient determination unit configured to determine using said processor, for said each pixel in the output image, first interpolation coefficients according to a value of its reference pixel position; and
an interpolation calculation unit configured to obtain using said processor the pixel value in the output image from the values of said plurality of pixels and the first interpolation coefficients; wherein the interpolation coefficient determination unit includes
an interpolation coefficient calculation unit configured to determine using said processor second interpolation coefficients from said value of its reference pixel position and a predetermined function, and
an interpolation coefficient switching unit configured to output using said processor the second interpolation coefficients or predetermined third interpolation coefficients as the first interpolation coefficients according to the reference pixel position calculated by the reference pixel position calculation unit and the decision by the decision unit.

2. The image processing apparatus of claim 1, wherein
the pixel positions of the pixels in the input image and output images are expressed by two-dimensional coordinates, and the spacing between the pixels in terms of the coordinate value is '1' both in the first and second directions, and
the correction value storage unit stores the correction values P2(M, N) for pixels in positions expressed by coordinates (Ts×M, Tt×N) in the output image, where Ts and Tt are positive integers and M and N are integers greater than or equal to zero.

3. The image processing apparatus of claim 2, wherein the reference pixel position calculation unit determines, for the pixel at the position represented by the coordinates (S, T) in the output image, coordinates (Q, R) representing the position before the coordinate transformation by the following interpolation calculation, where S and T are the coordinates in the output image, J is a quotient when S is divided by Ts, A is a remainder when S is divided by Ts, K is a quotient when T is divided by Tt, and B is a remainder when T is divided by Tt:

$$Q = S + \frac{(Ts - A) \cdot PK0 + A \cdot PK1}{Ts}$$

$$R = T$$

where, $$PK0 = \frac{(Tt - B) \cdot P2(J, K) + B \cdot P2(J, K+1)}{Tt}$$

$$PK1 = \frac{(Tt - B) \cdot P2(J+1, K) + B \cdot P2(J+1, K+1)}{Tt}.$$

4. The image processing apparatus of claim 3, wherein at least one of said Ts and Tt is expressed as a power of two.

5. The image processing apparatus of claim 3, wherein the decision unit decides, for the pixel at the position represented by the coordinates (S, T) in the output image, that the condition is satisfied if the correction values P2(J, K), P2(J+1, K), P2(J, K+1), and P2(J+1, K+1) are all zero, and otherwise decides that the condition is not satisfied.

6. The image processing apparatus of claim 5, wherein if the pixel value of a pixel at a position represented by coordinates (g, h) in the input image is denoted D0(g, h), an integer part of coordinate Q in the first direction is denoted QINT, and n and m are integers greater than or equal to zero, the image data reading unit reads n+m+1 pixel values D1(i) given by the following equation from the image data storage unit:

$$D1(i)=D0(QINT+i,R), i=-n, -n+1, \ldots, m.$$

7. The image processing apparatus of claim 6, wherein if a fraction part of the coordinate Q in the first direction is denoted QDEC, the interpolation coefficient determination unit determines n+m+1 first interpolation coefficients C6(i) from the value of QDEC and the output result of the decision unit.

8. The image processing apparatus of claim 7, wherein
the pixel value of a pixel a position expressed by coordinates (S, T) in the output image is represented by D7(S, T), and
the interpolation calculation unit obtains the pixel value D7(S, T) from the pixel values D1($i$) and the first interpolation coefficients C6($i$) by using the following equation:

$$D7(S, T) = \sum_{i=-n}^{m} C6(i) \cdot D1(i).$$

9. The image processing apparatus of claim 8, wherein if the predetermined function is denoted f(x), the interpolation coefficient calculation unit determines, as the second interpolation coefficients, n+m+1 coefficients C6A(i) given by the following interpolation coefficient calculation equation using the value of the fraction part QDEC of the coordinate Q in the first direction and the predetermined function f(x):

$$C6A(i)=f(i-QDEC), i=-n, -n+1, \ldots, m.$$

10. The image processing apparatus of claim 9, wherein the frequency response of a linear filter expressed by the second interpolation coefficients determined from the interpolation coefficient calculation equation is '1' for all frequencies only when the value of the fraction part QDEC of the coordinate Q in the first direction is '0'.

11. The image processing apparatus of claim 10, wherein the third interpolation coefficients include n+m+1 coefficients and the frequency response of a linear filter expressed by the third interpolation coefficients is less than unity in at least part of a frequency region.

12. The image processing apparatus of claim 11, wherein the third interpolation coefficients C6B(i) satisfy the following condition expressed by the delta function $\delta(x)$ and an integer i:

$$C6B(i) \neq \delta(i) \cap \sum_{i=-n}^{m} C6B(i) = 1.$$

13. The image processing apparatus of claim 12, wherein said interpolation coefficient switching unit
outputs the second interpolation coefficients as the first interpolation coefficients when the decision unit determines that the predetermined condition is satisfied,
outputs the second interpolation coefficients as the first interpolation coefficients when the decision unit determines that the predetermined condition is not satisfied, and the value of the fraction part QDEC is zero, and
outputs the third interpolation coefficients as the first interpolation coefficients when the decision unit determines that the predetermined condition is not satisfied, and the value of the fraction part QDEC is zero.

14. The image processing apparatus of claim 9, wherein the predetermined function f(x) satisfies the following condition expressed using a delta function $\delta(x)$ defined as $$\delta(x) = \begin{cases} 1 & (x=0) \\ 0 & (x \neq 0) \end{cases}$$

and an integer i, where $\alpha$ is an arbitrary value satisfying $0<\alpha<1$:

$$f(i) = \delta(i) \cap f(i-\alpha) \neq \delta(i) \cap \sum_{i=-n}^{m} f(i-\alpha) = 1.$$

15. The image processing apparatus of claim 1, wherein the first direction is a horizontal direction and the second direction is a vertical direction.

16. The image processing apparatus of claim 1, wherein the first direction is a vertical direction and the second direction is a horizontal direction.

17. An image processing method and that generates an output image from an input image having pixels arranged in mutually different first and second directions in a matrix, at least part of the input image being enlarged or reduced in the output image,
the at least part of the input image being enlarged or reduced by determining a pixel value of a pixel assumed to exist at a position in the input image before the enlarging or reducing coordinate transformation, and using the pixel value thus determined as a pixel value of the output image,
the image processing method comprising:
a processor to perform the steps of;
a step of reading correction values of representative pixels from a correction value storage unit holding, as the correction values, for each of at least some of the pixels in the output image being the representative pixels, a difference between the coordinate of the pixel in the first direction and the coordinate in the first direction before the coordinate transformation in the input image, for use in determining the pixel value of said each of the representative pixels;
a reference pixel position calculation step for determining a position in the input image before the coordinate transformation by an interpolation calculation using the correction values for the representative pixels, in order to determine the pixel value of said each pixel in the output image, and outputting the result as a reference pixel position;
a decision step for deciding, for each pixel in the output image, whether or not the correction values used in the interpolation calculation satisfy a predetermined condition;
an image data reading step for reading from the image data storage unit, for each pixel in the output image, the pixel values of plurality of pixels including said each pixel and pixels positioned in its vicinity according to values of these reference pixel positions;
an interpolation coefficient determination step for determining, for said each pixel in the output image, first interpolation coefficients according to a value of its reference pixel position; and
an interpolation calculation step for obtaining the pixel value in the output image from the values of said plurality of pixels and the first interpolation coefficients; wherein
the interpolation coefficient determination step includes;
an interpolation coefficient calculation step for determining second interpolation coefficients from said value of its reference pixel position and a predetermined function, and
an interpolation coefficient switching step for outputting the second interpolation coefficients or predetermined third interpolation coefficients as the first interpolation coefficients according to the reference pixel position calculated by the reference pixel position calculation step and the decision by the decision step.

18. The image processing method of claim 17, wherein the first direction is a horizontal direction and the second direction is a vertical direction.

19. The image processing method of claim 17, wherein the first direction is a vertical direction and the second direction is a horizontal direction.

20. An image display apparatus that displays an image on a projection surface by use of an image projection unit having an optical system, the image display apparatus enlarging or reducing at least part of the input image with characteristics inverse to an optical distortion caused by the optical system by using the image processing apparatus of claim 1, and displaying the enlarged or reduced output image.

21. An image display apparatus that displays an image on a projection surface by use of an image projection unit having an optical system, the image display apparatus enlarging or reducing at least part of the input image with characteristics inverse to an optical distortion caused by the optical system by using the image processing method of claim 17 and displaying the enlarged or reduced output image.

22. An image display apparatus that displays an image on a projection surface by use of an image projection unit having an optical system, the image display apparatus comprising a first image processing apparatus, and a second image processing apparatus, and processing at least part of an input image with characteristics inverse to an optical distortion caused by the optical system by using the first image processing apparatus, then processing at least another part of the input image with characteristics inverse to the optical distortion caused by the optical system by using the second image processing apparatus, and displaying the obtained output image;

each of said first image processing apparatus and said second image processing apparatus being configured as set forth in claim 1, said first direction in said first image processing apparatus is one of horizontal and vertical directions;

said second direction in said first image processing apparatus is the other of the horizontal and vertical directions;

said first direction in said second image processing apparatus is said other of horizontal and vertical directions;

said second direction in said second image processing apparatus is said one of the horizontal and vertical directions;

said first image processing apparatus receives the input image of the image display apparatus as the input image of the first image processing apparatus, the output image of the first image processing apparatus is supplied to the second image processing apparatus as the input image of the second image processing apparatus, and the output image of the second image processing apparatus is supplied to the image projection apparatus.

23. An image display apparatus that displays an image on a projection surface by use of an image projection unit having an optical system, the image display apparatus displaying the image obtained by processing at least part of an input image with characteristics inverse to an optical distortion caused by the optical system by using a first image processing method, then processing at least another part of the input image with characteristics inverse to the optical distortion caused by the optical system by using a second image processing method, and displaying the obtained output image;

each of said first image processing method and said second image processing method being as set forth in claim 17, said first direction in said first image processing method is one of horizontal and vertical directions;

said second direction in said first image processing method is the other of the horizontal and vertical directions;

said first direction in said second image processing method is said other of horizontal and vertical directions;

said second direction in said second image processing method is said one of the horizontal and vertical directions;

said first image processing method receives the input image of the image display apparatus as the input image of the first image processing method, the output image of the first image processing method is supplied to the second image processing method as the input image of the second image processing method, and the output image of the second image processing method is supplied to the image projection apparatus.

\* \* \* \* \*